US009681357B1

(12) United States Patent
Mawrey et al.

(10) Patent No.: US 9,681,357 B1
(45) Date of Patent: *Jun. 13, 2017

(54) SYSTEM, METHOD, AND COMPUTER-READABLE MEDIUM FOR INTERACTION WITH A DEVICE VIA A MODULE-BASED DEVICE INTERACTION SYSTEM ENABLED FOR WIRELESS COMMUNICATION

(71) Applicant: ioBridge, Inc., Marlborough, MA (US)

(72) Inventors: Robert Stanley Mawrey, Ashland, MA (US); Jason Thomas Winters, Winston-Salem, NC (US); Peter Thomas Scharler, Uniontown, PA (US)

(73) Assignee: ioBridge, Inc., Marlborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/205,011

(22) Filed: Mar. 11, 2014

Related U.S. Application Data

(63) Continuation-in-part of application No. 14/148,808, filed on Jan. 7, 2014, now Pat. No. 9,497,261, which
(Continued)

(51) Int. Cl.
G06F 15/16 (2006.01)
H04W 40/24 (2009.01)
(Continued)

(52) U.S. Cl.
CPC ............ *H04W 40/24* (2013.01); *H04L 43/10* (2013.01); *H04L 67/42* (2013.01)

(58) Field of Classification Search
CPC . H04L 12/1813; H04L 51/046; H04L 65/403; G06F 15/16; G06Q 50/01; G06Q 20/401
(Continued)

(56) References Cited

U.S. PATENT DOCUMENTS 5,822,398 A 10/1998 Hall
5,915,119 A 6/1999 Cone
(Continued)

FOREIGN PATENT DOCUMENTS

ES 2315049 A1 3/2009
JP 2005109763 4/2005

OTHER PUBLICATIONS

Author Unknown, BigFix Power Management: User's Guide.: Published by BIgFix, Inc. Apr. 2009, 26 pages.
(Continued)

*Primary Examiner* — Tesfay Yohannes
(74) *Attorney, Agent, or Firm* — Cesari & McKenna, LLP; Omar M. Wadhwa

(57) ABSTRACT

A system, method, and computer-readable storage medium that enable the monitoring and control of a device via a network, such as the Internet, via an interactive hardware module that interfaces with the device and communicates with a module server located locally or remotely from the placement of the module. The hardware module allows for the transmission and receipt of data between the device interfaced to the hardware module and the module server, thereby enabling the user manually or automatically to control or monitor the device via an access medium, such as an API. The hardware module and the device may be interfaced via a wired or a wireless connection. Furthermore, the hardware module and the module server may enable the activation of an inactive device from a remote location.

18 Claims, 13 Drawing Sheets

Related U.S. Application Data is a continuation-in-part of application No. 14/144,074, filed on Dec. 30, 2013, now Pat. No. 9,497,272, which is a continuation of application No. 13/585,362, filed on Aug. 14, 2012, now Pat. No. 8,667,102, which is a continuation of application No. 12/629,455, filed on Dec. 2, 2009, now Pat. No. 8,271,629.

(60) Provisional application No. 61/776,877, filed on Mar. 12, 2013, provisional application No. 61/200,692, filed on Dec. 2, 2008.

(51) Int. Cl.
*H04L 12/26* (2006.01)
*H04L 29/06* (2006.01)

(58) Field of Classification Search
USPC .......................................... 709/203, 217, 250
See application file for complete search history.

(56) References Cited

U.S. PATENT DOCUMENTS

| | | | |
|---|---|---|---|
| 6,332,202 B1 | 12/2001 | Sheikh et al. | |
| 6,421,782 B1 | 7/2002 | Yanagisawa et al. | |
| 6,526,507 B1 | 2/2003 | Cromer et al. | |
| 6,591,368 B1 | 7/2003 | Ryu | |
| 6,628,663 B1 | 9/2003 | Cromer et al. | |
| 6,785,805 B1* | 8/2004 | House | G06Q 10/087 700/90 |
| 6,826,689 B1 | 11/2004 | Hou | |
| 6,996,773 B2 | 2/2006 | Friedman et al. | |
| 7,170,391 B2* | 1/2007 | Lane | G06K 19/025 340/10.5 |
| 7,216,043 B2 | 5/2007 | Ransom | |
| 7,248,978 B2 | 7/2007 | Ransom | |
| 7,298,259 B2 | 11/2007 | Moriwaki | |
| 7,334,051 B2 | 2/2008 | Koyata et al. | |
| 7,350,238 B2 | 3/2008 | Abe et al. | |
| 7,379,474 B1 | 5/2008 | Wong | |
| 7,450,638 B2 | 11/2008 | Iwamura | |
| 7,600,064 B2 | 10/2009 | Knowles et al. | |
| 7,643,487 B2 | 1/2010 | Sethuram et al. | |
| 7,725,944 B2* | 5/2010 | Spalink | G06F 21/6254 705/74 |
| 7,734,380 B2 | 6/2010 | Ransom | |
| 7,780,514 B2 | 8/2010 | Walker et al. | |
| 7,861,006 B2* | 12/2010 | McNulty | H04L 63/0272 709/250 |
| 7,908,666 B2 | 3/2011 | Chida et al. | |
| 2002/0038371 A1 | 3/2002 | Spacey | |
| 2003/0204756 A1 | 10/2003 | Ransom | |
| 2003/0215114 A1 | 11/2003 | Kyle | |
| 2004/0138835 A1 | 7/2004 | Ransom | |
| 2005/0005026 A1 | 1/2005 | Brown et al. | |
| 2005/0021711 A1 | 1/2005 | Stieger et al. | |
| 2005/0055725 A1* | 3/2005 | Stewart | H04N 7/17336 725/92 |
| 2005/0138432 A1 | 6/2005 | Ransom | |
| 2005/0177507 A1* | 8/2005 | Bandych | G06Q 20/102 705/40 |
| 2005/0180326 A1 | 8/2005 | Goldflam et al. | |
| 2005/0208825 A1* | 9/2005 | Chan | H04B 3/56 439/505 |
| 2006/0067357 A1 | 3/2006 | Rader | |
| 2006/0077423 A1 | 4/2006 | Mathieson et al. | |
| 2006/0181846 A1 | 8/2006 | Farnsworth et al. | |
| 2007/0067445 A1 | 3/2007 | Vugenfirer et al. | |
| 2007/0070998 A1 | 3/2007 | Sethuram et al. | |
| 2007/0162417 A1 | 7/2007 | Cozianu et al. | |
| 2007/0192579 A1 | 8/2007 | Lee et al. | |
| 2007/0245086 A1 | 10/2007 | Odom | |
| 2007/0250597 A1 | 10/2007 | Resner et al. | |
| 2008/0076528 A1* | 3/2008 | Nguyen | G07F 17/32 463/25 |
| 2008/0080500 A1 | 4/2008 | Shimura et al. | |
| 2008/0229091 A1 | 9/2008 | Abu-Akel | |
| 2008/0319914 A1* | 12/2008 | Carrott | G06Q 20/02 705/75 |
| 2009/0067441 A1* | 3/2009 | Ansari | H04L 12/2814 370/401 |
| 2009/0172163 A1 | 7/2009 | Carroll | |
| 2009/0210519 A1 | 8/2009 | Zill et al. | |
| 2009/0216827 A1 | 8/2009 | Hirase et al. | |
| 2009/0285545 A1 | 11/2009 | Bon | |
| 2010/0057943 A1* | 3/2010 | Petricoin, Jr. | G08B 25/003 710/10 |
| 2010/0076662 A1 | 3/2010 | Sheidler | |
| 2010/0174660 A1* | 7/2010 | Clark | G06Q 20/403 705/318 |
| 2010/0191795 A1* | 7/2010 | Hering | H04W 24/00 709/202 |
| 2010/0235279 A1* | 9/2010 | Bouchard | G06Q 20/02 705/44 |
| 2010/0260037 A1 | 10/2010 | Wu et al. | |
| 2011/0131292 A1* | 6/2011 | McNulty | H04L 63/0272 709/217 |
| 2011/0225293 A1* | 9/2011 | Rathod | G06F 17/30867 709/224 |
| 2012/0131158 A1* | 5/2012 | Winters | H04L 12/12 709/222 |
| 2012/0278636 A1 | 11/2012 | Lin et al. | |

OTHER PUBLICATIONS tscot91 et al. "WOL Question—Different Subnets in Same Building." Aug. 25-Sep. 9, 2010, 4 pages. Available online: https://www.ibm.com/developerworks/community/forums/html/topic?id=77777777-0000-0000-0000-000014739143.

Guido Socher. "Using the tuxgraphics embedded web server for Wake on Lan (WOL)." 5 pages. Dated Apr. 14, 2009. Archived Apr. 25, 2009. Available online: https://web.archive.org/web/20090425154159/http://tuxgraphics.org/electronics/200904/wol.shtml.

Machine translation of JP 2005109763 A.

Yehuda Katz. wake.on_lan.widget.php. 78 lines on 3 pages. Posted Dec. 15, 2010. Available online: https://github.com/pfsense/pfsense/commit/254ac496401b2259a17dc2deee1fa19f963d89c6.

Yehuda Katz et al. "Feature #1103: Wake-on-Lan Widget for Dashboard (with code)". Dec. 14, 2010. 2 pages. Available online: https://redmine.pfsense.org/issues/1103.

Pan-Lung Tsai, Chin-Laung Lei, Wen-Yang Wang. "A Remote Control Scheme for Ubiquitous Computing." in "Proceedings of the 2004 IEEE International Conference on Networking, Sensing, and Control". Taipei, Taiwan: Mar. 21-23, 2004. pp. 1020-1025.

"Wake up on LAN". Author unknown. Post dated Sep. 10, 2004. 2 pages. Available online: http://www.nbtnet.newboundary.com/forum/Topic687-20-1.aspx.

"Wake up on LAN problems". Author unknown. Post dated May 15, 2007. 2 pages. Available online: http://www.nbtnet.newboundary.com/forum/Topic1485-5-1.aspx.

"Troubleshooting tips for Wake on LAN (WOL)". Author unknown. Dated Oct. 4, 2005. Archived Jan. 2, 2007. 3 pages. Available online: https://web.archive.org/web/20070102040558/http://www.nbtnet.newboundary.com/supportkb/Article.aspx?id=10264.

"Prism Deploy Guide." Author unknown. Published Dec. 2010 by New Boundary Technologies, Inc. 92 pages.

Gil-Martinez-Abarca, J.A, Marcos-Jorquera, D., Gilart-Iglesias, V. "Wake on LAN over Internet as Web Service." Published in: IEEE Conference on Emerging Technologies and Factory Automation, 2006. Sep. 20-22, 2006. pp. 1261-1268.

Macia-Perez et al. Machine translations of description and claims for Spanish patent application #200501234, filed May 20, 2005 and published in Spanish on Mar. 16, 2009 as publication No. ES2315049A1.

(56) References Cited

OTHER PUBLICATIONS

Wolfgang, "ioBridge Connect. Forums . General . Feature Requests . WOL, Wake on Lan", Originally dated Apr. 12, 2009. 2 printed pages. Available online: https://web.archive.org/web/20160509172136/https://connect. iobridge.com/forum/wol-wake-on-lan/.

C Morris (ed.) "Module". in Academic press Dictionary of science and technology. Oxford, United Kingdom: Elsevier Science & Technology, 1992. 2 pages. Available from: http://search.credoreference.com/content/entry/apdst/module/0.

ioBridge, "X10 Home Automation: Control your X1—modules online via your secure dashboard or website" Archived Aug. 6, 2010, 2 pages, Available Online: https://www.archive.org/web/20100806181211/http://iobridge/com/technology/x10-home-automation.html.

Cygnet853, "x10 control with iobridge" youtube video uploaded Dec. 7, 2008, one minute, 23 secs., available online: https://www.youtube.com/watch?v=Pr-DkaWkK0o.

ioBridge. "IO-204 Monitor & Control Module" Updated Dec. 30, 2008. Archived Jan. 26, 2009. 10 Pages. Available Online: https://web.archive/org/web/20090126231854/http://iobridge.com/technology/IO-2-4_manual.pdf.

ioBridge. "Technology: Here is how are [sic] system works" Archived Dec. 10, 2008, 2 pages. available online: https://web/archive.org/web/20081210154400/http://www.iobridge.com/technology/.

ioBridge. "Data Feed API" updated Dec. 25, 2008, Archived Jan. 26, 2009. 9 pages. Available online: https://web.archive.org/web/20090126205433/http://iobridge.com/technology/Data_Feed_API.pdf.

C. Morris (ed.) "Module" In Academic press Dictionary of science and technology. Oxford, United Kingdom: Elsevier Science & Technology, 1992. 2 pages. Available from http://search.credoreference.com/content/entry/apdst/module/0.

Alan Hourihane, Robert Ellison, and Brian Paul. "VNC Proxy User Guide" Archived Mar. 3, 2008. 4 printed pages. Available online: http://web.archive.org/web/20080303205346/http://vncproxy.sourceforge.net/proxy.html.

\* cited by examiner

SYSTEM, METHOD, AND COMPUTER-READABLE MEDIUM FOR INTERACTION WITH A DEVICE VIA A MODULE-BASED DEVICE INTERACTION SYSTEM ENABLED FOR WIRELESS COMMUNICATION

CROSS-REFERENCE

This application claims the benefit of U.S. provisional application No. 61/776,877, filed Mar. 12, 2013 and is also a continuation-in-part of U.S. patent application Ser. No. 14/148,808, filed Jan. 7, 2014, which is a continuation-in-part of U.S. patent application Ser. No. 14/144,074, filed Dec. 30, 2013, which is a continuation of U.S. patent application Ser. No. 13/585,362, filed Aug. 14, 2012, which is a continuation of U.S. patent application Ser. No. 12/629,455, filed Dec. 2, 2009, now issued U.S. Pat. No. 8,271,629, which claims the benefit of U.S. provisional application No. 61/200,692, filed Dec. 2, 2008. This is also related to U.S. patent application Ser. No. 13/351,608 and U.S. patent application Ser. No. 13/220,685, filed Aug. 30, 2011. All these aforementioned applications, and any application claiming priority to them, are incorporated by reference herein, in entirety, for all purposes.

TECHNICAL FIELD

This application relates generally to the control of remote mechanisms via a network. More particularly, the present invention relates to enabling a device with Internet connectivity via a medium for controlling or monitoring the device via a network connection.

BACKGROUND

Controlling devices over the Internet requires considerable knowledge across several fields. For example, to manipulate a device via the Internet, such as via an interactive Web site, a person may need to understand Web site design, networking, server management, communication protocols, multiple programming languages, embedded systems, and mechatronics. As such, the vast majority of people do not possess the necessary skills to configure a system allowing for the control of a device via the Internet.

In addition to the knowledge required, the hardware requirements of such an undertaking are prohibitive to small entities, such as individuals or small organizations. Current Internet-based device monitoring and control interface systems are meant for industrial applications. The expense and power requirements of industrial equipment are too great to make this a realistic solution. In addition, the equipment is rather large, consuming large cabinets and racks impractical for home or small business use. This solution may also require familiarity with the equipment's programming interface and custom cabling and hardware.

Other current solutions for Internet-based device control require a person to establish a server which accepts requests from the Internet. These servers are typically embedded Web servers that host their own Web pages for device interaction. The Internet connections employed by small entities are typically based on dynamic internet protocol (IP) address assignment. Hosting a server on a dynamic IP address is problematic because the IP address may change, causing a disruption in the server's connection to the Internet and preventing a remote user from contacting the server. Additionally, hosting a server requires the user to configure the local network. An average person may have difficulty with the intricacies of remapping router ports and other such matters. Furthermore, some individuals may not have access to their Internet connection networking equipment, such as people living in apartment complexes or dormitories. Internet Service Providers (ISPs) may cause additional problems for server-based architectures. Many ISPs frown upon users hosting servers and may block ports used for this.

Both the aforementioned industrial and server solutions lack convenient mechanisms for Web site and Web service integration. Considerable knowledge of Hypertext Markup Language (HTML), JavaScript, and Application Programming Interfaces (APIs) is required to place any controls on a Web site or to establish access via a Web service (such as a social network), web application, desktop program, mobile application, etc. As a result, such a solution requires customized Web site integration which, again, is beyond the skills of the average user.

One particular control procedure, Wake-on-LAN (WOL), pertains to activating ("waking") a device, such as a computer, from a remote location. An individual or an organization may wish to employ WOL to save on the costs accrued from running unnecessary devices full time. For example, a field agent may require occasional remote access to a computer at his company's headquarters. WOL technology would allow the company to only pay for the energy used by the computer when it was in use by the remote field agent. However, current systems do not allow for convenient or cost-effective WOL configurations, particularly when the device needs to be activated from outside the local network. For example, WOL is often accomplished by a user remotely connecting to a peer computer on a network and having it send a special network message, called a "magic packet," to the desired computer on the same network. The magic packet contains the media access control (MAC) address of the desired computer, thereby identifying it. This configuration requires that the peer computer be left continuously activated in order to activate other computers and, thus, does not resolve the problem, as power must be provided to the peer computer.

Additional obstacles arise when a user wishes to use the Internet to interact with devices that are not in close proximity to a network connection (e.g., a router) or a network interface. Using wires to connect nonadjacent devices is often troublesome and impractical. For example, if a user's Internet connection is located on the ground floor of a building, and the device he wishes to interact with is located on the second floor, the user would be required to run wire through the building's structure in some fashion. A user may seek to avoid the problems of wired connections by connecting the nonadjacent device via a wireless connection; however a wireless connection poses problems as well. The user may need to configure the device so that it interacts properly with a network connection, a server, and/or a mechanism used to interact with the device via the network. This can be a daunting task for an average user.

What is needed is a convenient mechanism that enables an average person to configure an architecture to control or monitor a device via an Internet-based medium. What is needed is a medium that may readily enable a device to connect to the Internet or another electronic network. Furthermore, what is needed is a mechanism for enabling a user to activate an inactive device via an Internet-based medium. Additionally, what is needed is a mechanism for enabling a device for wireless connectivity so that the device may be readily controlled or monitored via an Internet-based medium when the device is nonadjacent to network connection mechanism.

SUMMARY

The present invention addresses the aforementioned needs by providing a system, method, and computer-readable storage medium that enables a person to monitor and/or control a device via a network, such as the Internet, via an interactive hardware module that interfaces with the device and communicates with a module server located locally or remotely from the placement of the module. The hardware module allows for the transmission and receipt of data between the device interfaced to the hardware module and the module server, thereby enabling the user manually or automatically to control or monitor the device via an access medium, such as an API. The hardware module and the device may be interfaced via a wired or a wireless connection. Furthermore, the hardware module and the module server may enable the activation of an inactive device from a remote location.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof that are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person with ordinary skill in the relevant art will recognize that other components and configurations may be used without parting from the spirit and scope of the invention.

Figure 1:
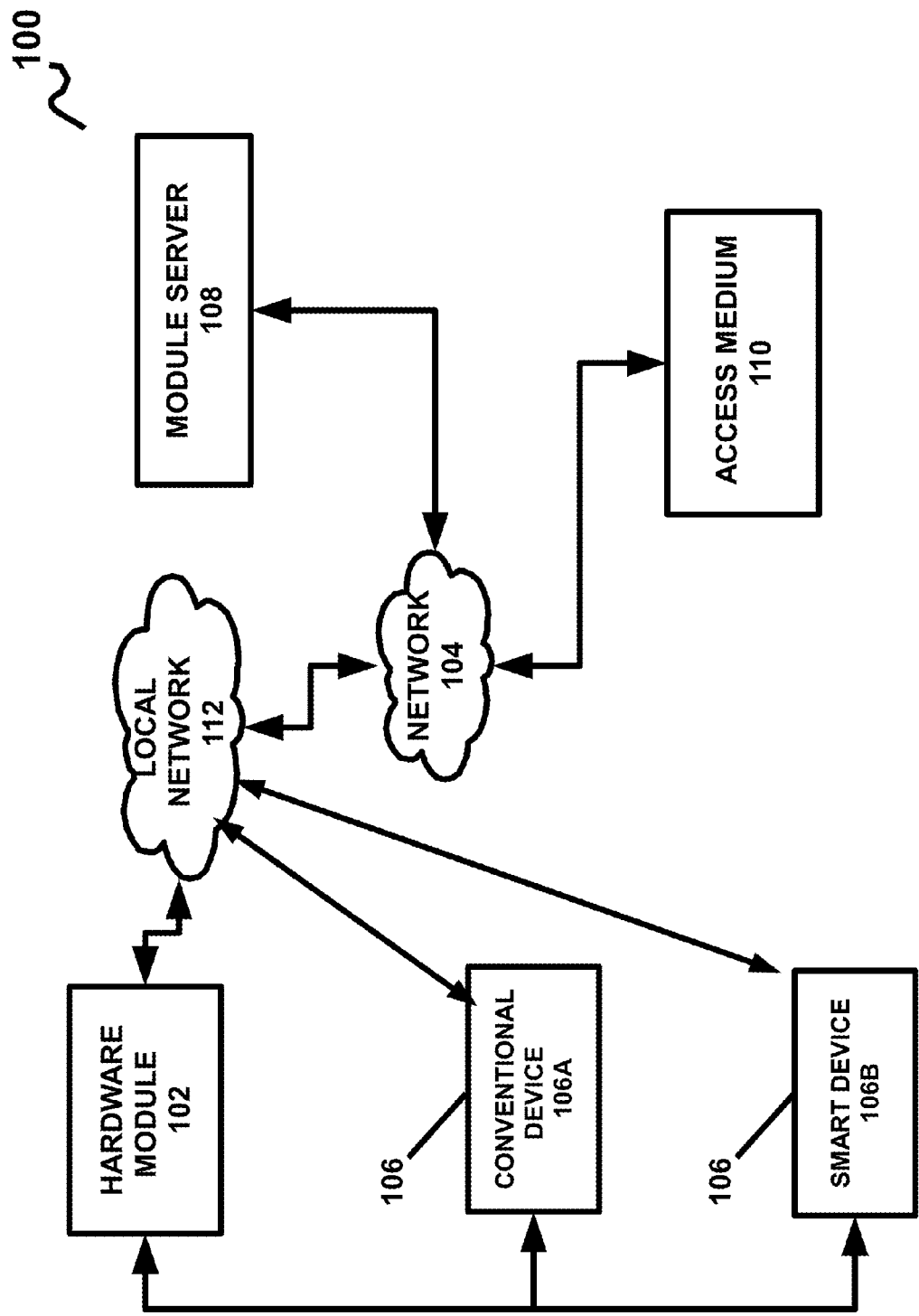
FIG. 1 illustrates a general architecture overview of a module-based device interaction system according to an example embodiment.

FIG. 1 illustrates a general architecture overview of an embodiment of a module-based device interaction system (MBDIS) 100. Although only a limited number of each component is depicted, this is for illustrative purposes only and is not to be construed as limiting. It is to be understood that the components depicted may be logical components and that the terminology used herein to describe each component is for illustrative purposes and is not to be construed as limiting. Components are herein referenced as "systems," "mechanisms," "modules," "processors," etc. Each component may include the necessary apparatuses, hardware, firmware, and/or software to enable the processing, storing, communicating and/or receiving of data. A component may include one or more computer processors, computer servers, data stores, electronic components, storage mediums, memory, etc. The functionality of a component may be directed by one or more executable computer-readable instructions received via a computer-readable storage medium. A processor may be included to execute one or more functions per instructions, programs, or processes stored in the processor itself and/or stored in another memory source. Memory may be any mechanism that is capable of storing data, such as computer programs, instructions, and other necessary data. One or more interfaces may be included to enable the presentation, manipulation, transmission, and receipt of data. Communication of data may be enabled by one or more networks or physical connections. A network may include one or more of a wide-area network (WAN) (such as the Internet), a local area network (LAN), a wireless local area network (WLAN), a mobile wireless network a combination of any of the foregoing, or any other suitable network and may include any component (physical or logical) necessary for a particular network's functionality, such as routers, adapters, subnets, etc.

The components of MBDIS 100 may interact with one another via network 104, which may be any applicable electronic and/or wireless network. For example, network 104 may be a WAN, such as the Internet or a mobile network (e.g., cellular). MBDIS 100 may include hardware module 102 configured to be an input/output (I/O) mechanism and enabled to allow for connections to one or more devices 106. Device 106 may include any applicable electronic device, such as a computer, a server, a sensor, a printer, a servo, an actuator, a switch, a control system, etc. Hardware module 102 may be connected via network 104 to module server 108, thereby serving as a link between device 106 and module server 108. Hardware module 102 may connect to network 104 via local network 112, which may be, for example, a LAN or WLAN. As used herein, local network 112 may include any component (physical or logical) necessary for the particular network's implementation, such as routers, adapters, subnets, etc. For example, various components may interact with one another via a router. Instead of, or in addition to, being connected to hardware module 102 directly, device 106 may interface with hardware module 102 via local network 112 and local network 112 may enable interaction between hardware module 102 and device 106. Although not explicitly depicted in FIG. 1, device 106 may interface with hardware module 102 via network 104, either in conjunction with local network 112 or independent from it.

Module server 108 may receive data messages sent by hardware module 102, such as those relayed from interfaced device 106. Module server 108 may relay such communication to access medium 110 and/or another hardware module 102 connected to network 104. Module server 108 may interface with access medium 110 to transmit communications to or from hardware module 102 and/or to configure hardware module 102.

Access medium 110 may be a mechanism by which a user may control or monitor device 106. For example, access medium 110 may enable a user to operate device 106, monitor the status of device 106, receive and/or review data generated by device 106, activate device 106, etc. In one embodiment, access medium 110 may be accessible by various agents, such as a personal computer, a mobile device, etc. For example, access medium 110 may be an Internet service, such as, for example, a streaming server, a push-driven server, an email server, a social network, a data store, an event notification service, a scripting server, a Web page, etc. Additionally, access medium 110 may comprise an API, such as a Web widget or gadget, another convenient programming interface, etc. Alternatively, access medium 110 may be a Web interface, such as a dynamic scripting, a Flash interface, etc.

Data transmitted between one or more of device 106, hardware module 102, module server 108, and access medium 110 may be encrypted, such as via a compressible encryption technique encapsulated and translated over common internetworking protocols and networking technologies.

Hardware Module

Hardware module 102 may act as a client to module server 108. This configuration enables MBDIS 100 to overcome problems inherent in hosting a server. A dynamic IP address is no longer problematic. Hardware module 102 may initiate the connection to module server 108 and, as such, there is no need to keep track of the user's IP address. Additionally, an ISP does not block outbound traffic from a user's location (as opposed to in-bound traffic, as would be the case if the user employed a local server), as this would be the equivalent to preventing the user from accessing the Internet entirely. Furthermore, as hardware module 102 itself establishes the connection as a client to module server 108, there is no need for any network configuration on the part of the user. All traffic generated by the use of hardware module 102 is viewed as normal traffic by network 104. This enables hardware module 102 to work through firewalls and proxy servers.

The design of hardware module 102 may vary per implementation. In one example, hardware module 102 may be constructed of a two-sided, 0.060 inch-thick printed circuit board (PCB). A top and bottom plate of 0.125 inch clear acrylic, fixed in place by spacers and screws, may provide a simple exterior structure for hardware module 102. A label on the top surface of hardware module 102 may indicate the model number, serial number, connection assignments, MAC address, and I/O channel pin out, etc. In totality, hardware module 102 may be 3.8 inches×2.5 inches×1.24 and weigh approximately 90 grams. In other scenarios, hardware module 102 may be smaller or larger and may be constructed of different materials. Other example implementations are described below.

Figure 2:
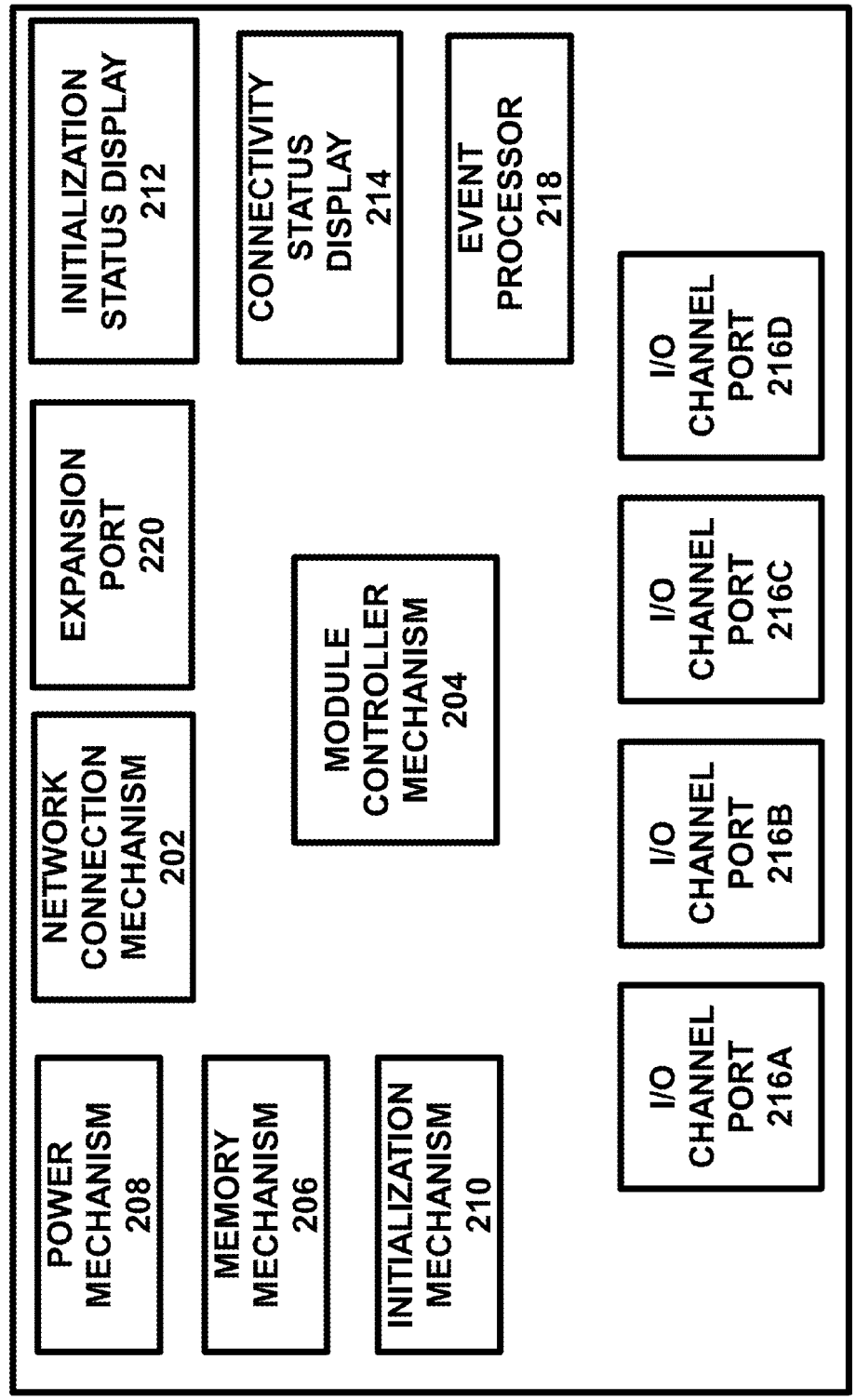
FIG. 2 illustrates a hardware module enabled for Internet-based device control or monitoring according to an example embodiment.
Figure 3:
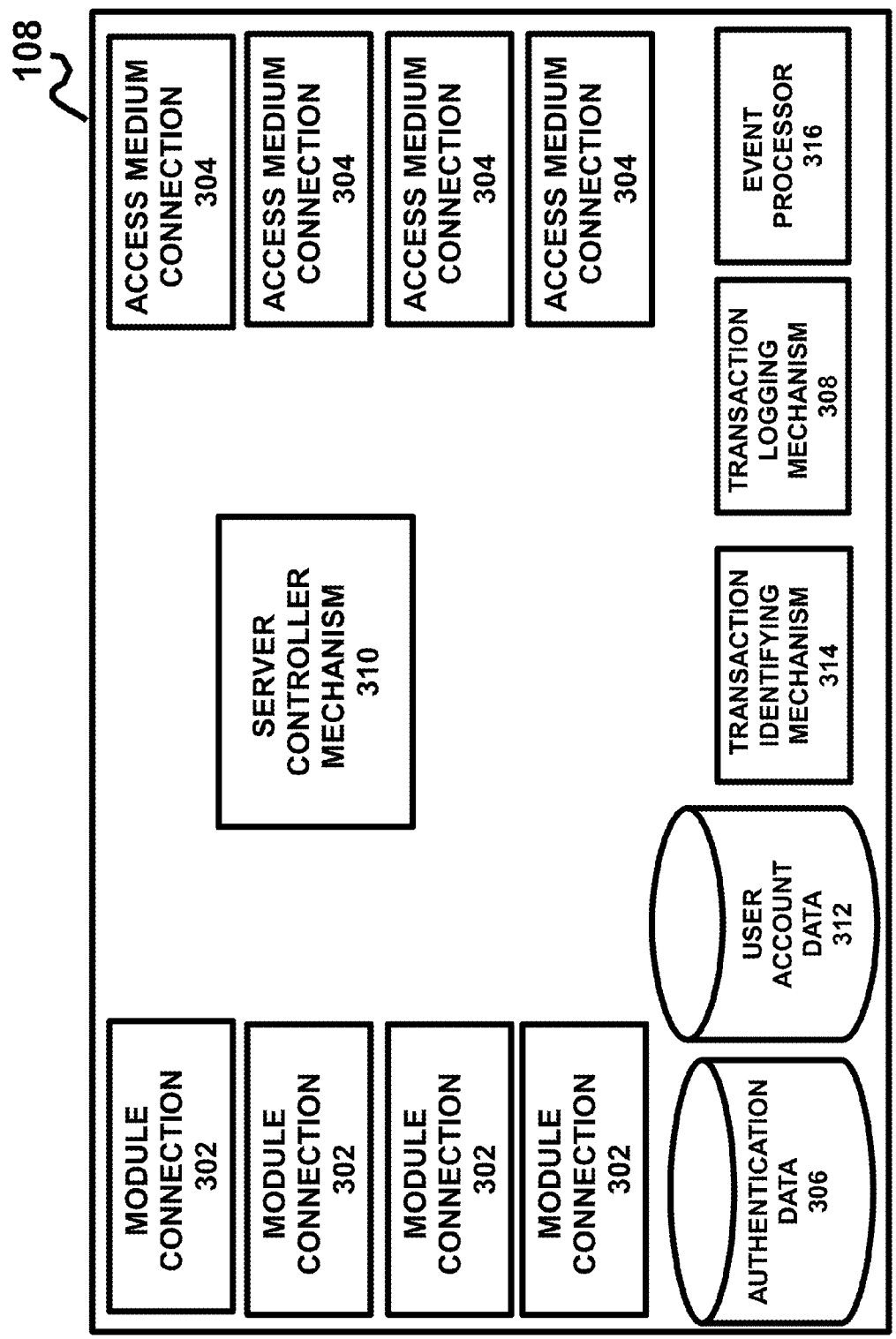
FIG. 3 illustrates a module server enabled to interact with a hardware module according to an example embodiment.
Figure 4:
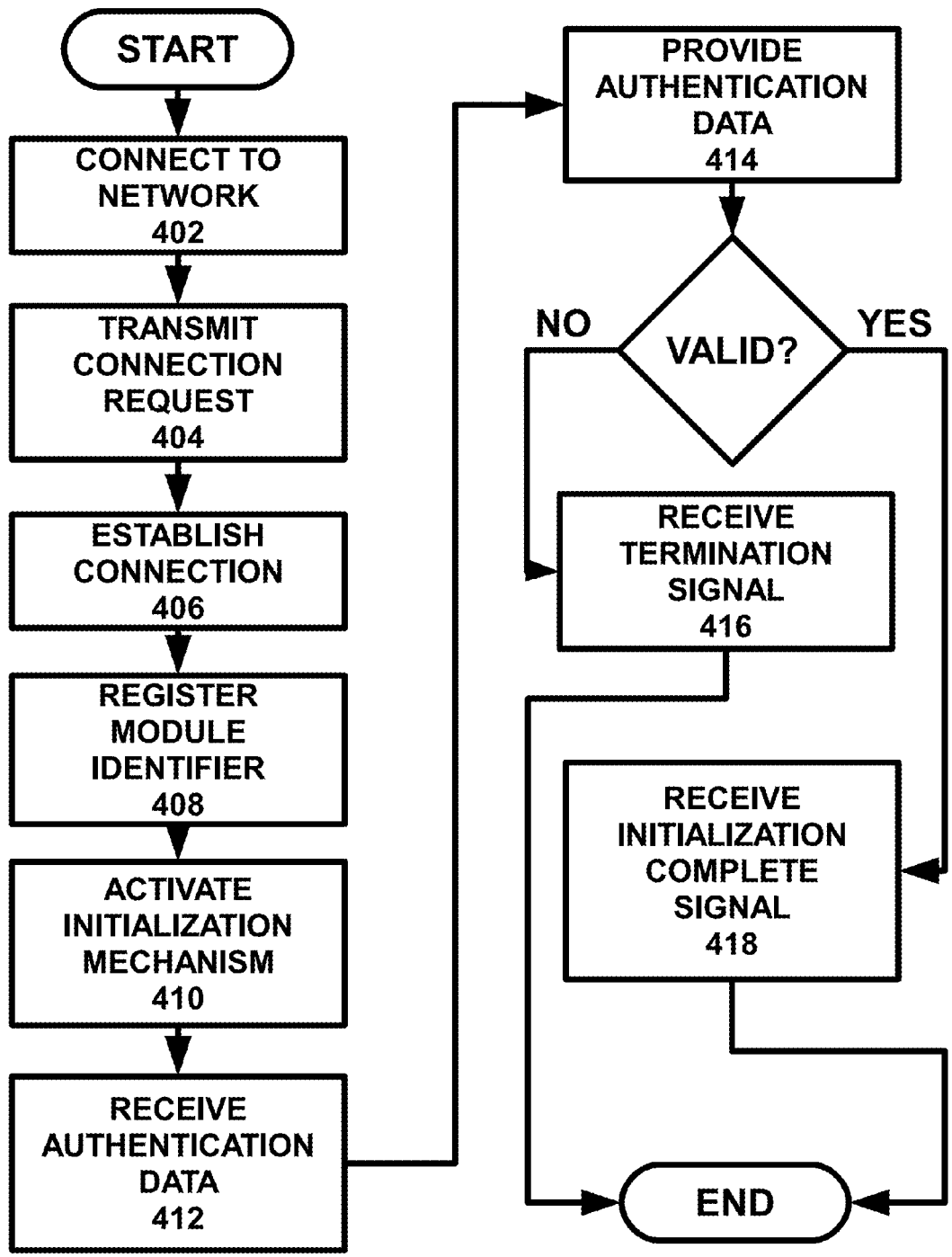
FIG. 4 illustrates a flowchart of a process of initializing a hardware module according to an example embodiment.

As illustrated by FIG. 2, in one embodiment, hardware module 102 may include network connection mechanism 202, module controller mechanism 204, memory mechanism 206, power mechanism 208, initialization mechanism 210, initialization status display 212, connectivity status display 214, one or more I/O channel ports 216, and event processor 218.

Hardware module 102 may be located at a location convenient to the entity employing it. For example, an individual may employ hardware module 102 at his residence or a small business owner may employ hardware module 102 at his work location. Hardware module 102 may be located anywhere, so long as the device 106 to be controlled or monitored may interface with network connection mechanism 202 directly, via the local network 112, and/or via a wireless connection.

Module controller mechanism 204 may communicate with the components of hardware module 102 to direct the flow of data, monitor and/or direct the activity of components, etc. For example, module controller mechanism 204 may communicate with network connection mechanism 202 to enable the communication of data to and from hardware module 102. In one embodiment, module controller mechanism 204 is a microcontroller, a microprocessor, etc. In addition to enabling the transmission of messages from an interfaced device 106 to module server 108, module controller mechanism 204 may relay messages from a device 106 interfaced with one I/O channel port 216 (e.g., I/O channel port 216A) to another device 106 interfaced with a different I/O channel port 216 (e.g., I/O channel port 216B).

Network connection mechanism 202 may enable hardware module 102 to connect to network 104, and thereby transmit and receive data from module server 108. In one embodiment, network connection mechanism 202 may connect with network 104 via local network 112. For example, hardware module 102 may function on any 10/100/1000 Base-T auto-negotiated network. In one embodiment, network connection mechanism 202 may enable a wired connection. For example, network connection mechanism 202 may be an Ethernet controller. Alternatively, network connection mechanism 202 may enable a wireless connection. Hardware module 102 may function via a Dynamic Host Configuration Protocol (DHCP) or static addressing. If local network 112 is configured for MAC filtering, the MAC address of hardware module 102 may be added to the local network router's list of allowable addresses. Alternatively, hardware module 102 may be connected to a non-MAC filtered network first and management tools may be used to change the MAC address of hardware module 102. Alternatively, hardware module 102 may connect to network 104 directly. Additionally, network connection mechanism 202 may enable hardware module 102 to interface with one or more devices 106 connected to local network 112 and/or the network 104.

When hardware module 102 connects to network 104, it may establish a communication link with module server 108. The communication link may be established through any known protocol, such as via Transmission Control Protocol/Internet Protocol (TCP/IP). Hardware module 102 may accept communications from and transmit messages to the module server 108.

Hardware module 102 may include memory mechanism 206 to store settings, data, etc. For example, memory mechanism 206 may be non-volatile random access memory (RAM).

Power mechanism 208 may enable the distribution of power to hardware module 102. For example, power mechanism 208 may enable and monitor the receipt of electricity to power hardware module 102 from an electrical cord, battery, solar terminal, etc.

Initialization mechanism 210 may be used to establish a connective link between hardware module 102 and a user account at module server 108. Additionally, initialization mechanism 210 may enable a user to reset hardware module 102 to a previous condition, such as its factory condition. Initialization mechanism 210 may be a manual implement. For example, initialization mechanism 210 may be a button that the user pushes or holds down. Alternatively, initialization mechanism 210 may be accessible electronically. For example, the user may operate initialization mechanism 210 via his computer, such as via an access medium 110.

Hardware module 102 may include one or more display mechanisms, such as initialization status display 212. Initialization status display 212 may relate information associated with hardware module's 102 connection to module server 108. For example, initialization status display 212 may indicate one or more of the following:
  hardware module 102 has booted successfully and is attempting to connect to local network 112;
  hardware module 102 has established a connection with local network 112;
  hardware module 102 has successful accomplished a DHCP transaction and now has an IP address;
  hardware module 102 is attempting to resolve remote server's hostname to an IP address;
  hardware module 102 successful DNS hostname resolution;
  hardware module 102 is looking for the Internet gateway MAC address;
  hardware module 102 has found the Internet gateway and is searching for a free a local TCP socket;
  hardware module 102 has located a free local TCP socket and is attempting to connect to module server 108;
  hardware module 102 has established a successful connection to module server 108 and authentication has commenced; or hardware module 102 has successfully undergone authentication and normal operation has commenced.

In one embodiment, initialization status display 212 is a seven segment LED numeric display.

Hardware module 102 may include connectivity status display 214. Connectivity status display 214 may indicate the state of connectivity between hardware module 102 and module server 108. For example, connectivity status display 214 may indicate one or more of the following:
  hardware module 102 is not connected to module server 108;
  hardware module 102 is connected to module server 108;
  hardware module 102 is powering up; or
  hardware module 102 has disconnected from module server 108 and is resetting.

Hardware module 102 may include one or more I/O channel ports 216 that may interface with one or more devices 106. Although four I/O channel ports 216 have been depicted in FIG. 2 (i.e., 216A, 216B, 216C, 216D), this is not to be construed as limiting and the amount may vary depending upon implementation. Device 106 may be any appropriate apparatus, such as conventional device 106A or smart device 106B (described in detail below).

Hardware module 102 may include expansion port 220. Expansion port 220 may enable a direct connection to module controller mechanism 204 and may allow hardware module 102 to be enabled for additional and/or enhanced functionality. In one embodiment, expansion port 220 may serve as an auxiliary I/O channel port. In another embodiment, expansion port 220 may serve as a network connection mechanism, such as an Ethernet port. For example, it may enable two-way communications via a connected mechanism.

Figure 7:
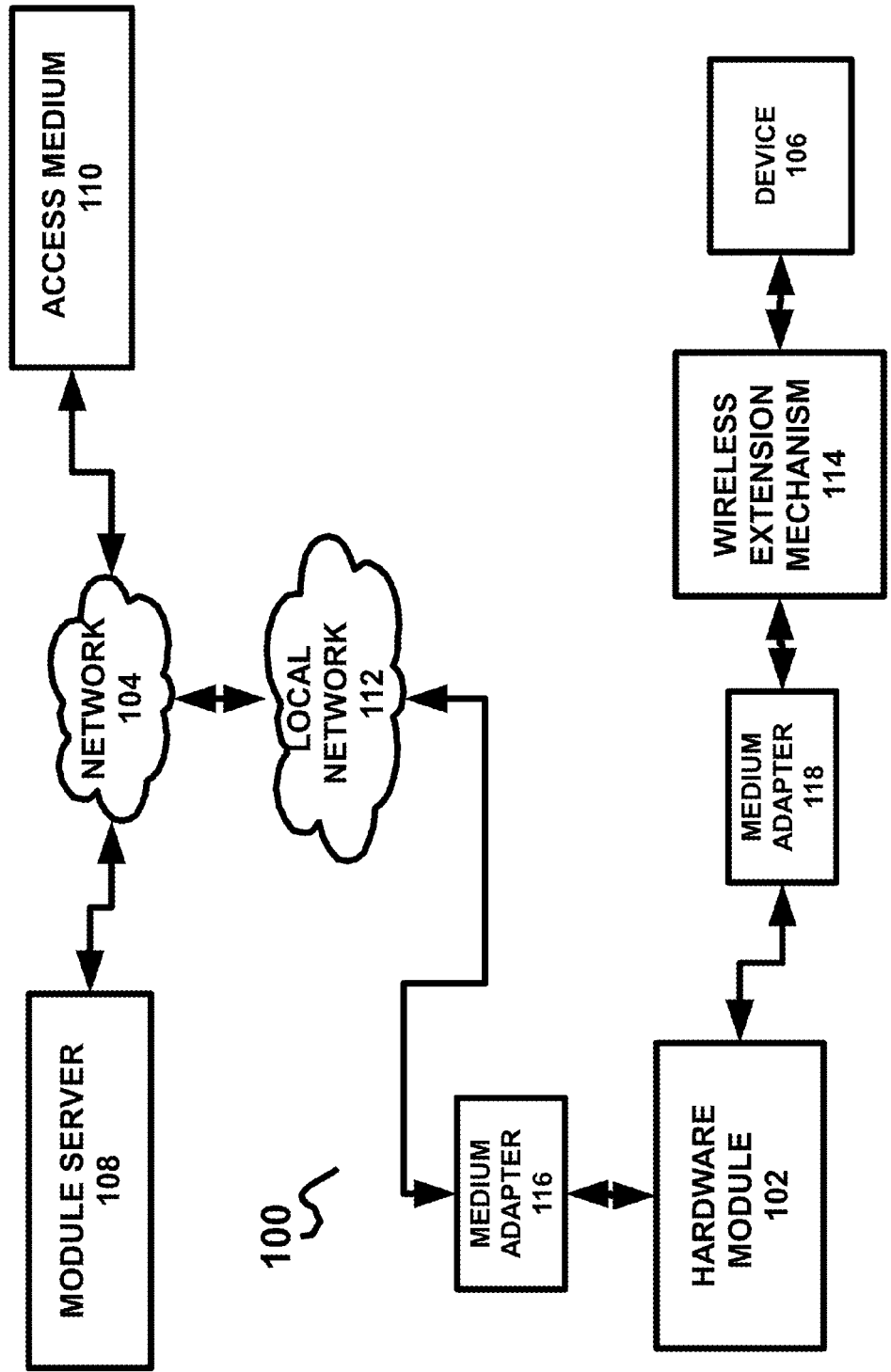
FIG. 7 illustrates a general architecture overview of a module-based device interaction system in which a hardware module interacts with a device via a wireless connection according to an example embodiment.

Hardware module 102 may interface with device 106 via a wired or wireless connection. For example, an I/O channel port 216 may include an outlet to receive a wired plug. Additionally, or alternatively, hardware module 102 may be configured to receive and/or transmit a wireless communications. In one embodiment, as depicted in FIG. 7, wireless extension mechanism 114 may interface device 106 with hardware module 102 wirelessly. Wireless communication between hardware module 102 and wireless extension mechanism 114 may be enabled by a medium adapter connected to one or more components, such as medium adapter 116 and medium adapter 118, respectively. For example, medium adapter 116 may be connected to hardware module 102 via an I/O channel port 216 or via expansion port 220. Medium adapter 116 and/or medium adapter 118 may enable various wireless communication methods and may enable the conversion of various communication methods. For example, a medium adapter may enable the conversion of an electronic signal to a fiber optic or radio frequency signal. In one embodiment, a medium adapter may be an adapter board that enables wireless point-to-point or mesh networking between hardware module 102 and wireless extension mechanism 114 (and, in turn device 106). Alternatively, hardware module 102 and/or wireless extension mechanism 114 may include a transmitter and/or receiver that enables wireless interfacing without one or more of medium adapter 116 and medium adapter 118.

As mentioned, network connection mechanism 202 may enable hardware module 102 to interface with device 106 via local network 112, network 104, or a combination thereof. In such a configuration, network connection mechanism 202 may serve as an I/O channel port 216.

Hardware module 102 may discover an interfaced device 106 manually or automatically. To manually discover device 106, the user may access his user account and indicate the type of device 106 he had interfaced. For example, a user may access a MBDIS Web site, log into his user account and indicate the type of device 106, such as via a dropdown menu or from a checkbox list. Alternatively, module controller mechanism 204 may include a discovery protocol which may enable plug and play functionality. For example, the discovery protocol may interrogate module controller mechanism 204 to determine whether interfaced device 106 is a conventional device 106A or a smart device 106B.

In one embodiment, each I/O channel port 216 has a separate digital input, analog input, and digital output. Each I/O channel port 216 may be configured to employ digital input and/or output, analog input and/or output, serial data input and/or output, pulse counting and/or generation, frequency counting and/or generation, audio input and/or output, video input and/or output, etc. Hardware module 102 may be configured to set the state (i.e., the digital voltage level) of output on a particular I/O channel port 216 and may read a voltage input level. As described below in regard to smart mode, an I/O channel port 216 may serve as a data channel for communication with interfaced smart devices 106B.

Each I/O channel ports 216 may be independent from one another and may be an input and output means for MBDIS 100. Communication from module server 108 to hardware module 102 may instruct hardware module 102 to change output lines on I/O channel ports 216 while communication from hardware module 102 to module server 108 may relay information about device 106 values and other inputs.

An I/O channel port 216 may include multiple lines, or "pins." The functionality of each pin may vary dependent upon the operating mode of the particular I/O channel port 216. An I/O channel port 216 may be capable of operating in one of two modes: normal mode and smart mode.

Normal Mode

When an I/O channel port 216 is set to normal mode, the hardware module 102 may use digital I/O and analog input capabilities native to the module controller mechanism 204 to interact with an interfaced device 106. For example, an I/O channel port 216 set to normal mode may be enabled for discreet digital input and/or output, pulse counting and/or generation, frequency counting and/or generation, serial input and/or output, and analog input and/or output, etc. In normal mode, hardware module 102 may interface with conventional devices, such as analog sensors, switches, lights, liquid crystal displays (LCDs), microcontroller units (MCUs), relays, microprocessors, etc. A device 106 connected to an I/O channel port 216 set to normal mode may be considered a conventional device 106A.

Smart Mode

When an I/O channel port 216 is set to smart mode, hardware module 102 may interface with more sophisticated devices 106. Smart mode may convert an I/O channel port 216 into a digital communication port allowing other equipment to interface with hardware module 102 and an I/O channel port 216 set for this mode may be capable of serial communication via standard and proprietary protocols. For example, smart mode may be employed if a particular function is beyond the scope of a simple analog sensor or digital I/O device. A device 106 interfaced to a smart mode-enabled I/O port channel 216 may be considered a smart device 106B. Smart device 106B may include its own controller mechanism, such as a microcontroller, microprocessor, etc., to manage communication via its particular I/O port channel 216. For example, smart devices 106B may be serial or servo controllers, Infrared receivers and transmitters, video devices, audio devices, USB hardware, wireless transceiver, medium adapters, other peripheral hardware, etc. Smart devices 106B provide data to hardware module 102, which may relay it to module server 108, which may in turn transmit it to an access medium or another hardware module 102. For example, the data may be sent to a networked data store for logging. Likewise, messages intended for smart device 106B may be received by module server 108, relayed to hardware module 102 and then transmitted to smart device 106B. Hardware module 102 need not directly manage smart device 106B. In one embodiment, hardware module 102 merely registers the existence of smart device 106B on startup and directs messages to and from it.

Hardware module 102 may act as a client while an interfaced smart device 106B may function as a server. Despite these roles, this configuration allows for smart device 106B to generate and transmit a message unsolicited to hardware module 102 and, in turn, module server 108.

Hardware module 102 may include event processor 218. Event processor 218 may monitor behavior of an interfaced device 106 and, when, a particular event occurs, event processor 218 may push a message to another device 106 interfaced with hardware module 102 or to module server 108 and, in turn, access medium 110 or one or more additional hardware modules 102. For example, if a device 106 interfaced with hardware module 102 is a thermometer, event processor 218 may send a message to a second interfaced device 106 or to module server 108 when a particular temperature is reached. As another example, event processor 216 may receive video or audio data and, in turn, initiate a message transmission. In addition to, or instead of, initiating the pushing of data based upon a particular device event, event processor 218 may push messages via an established schedule. For example, an interfaced device 106 may be a lamp and a user may configure hardware module 102 to turn on the lamp at a certain time on a certain day. Furthermore, event processor 218 may communicate data when requested by access medium 110. For instance, continuing with the thermometer example, the user may employ access medium 110 to request the thermometer's current temperature reading. Additionally, event processor 218 may periodically poll module server 108 for data, commands, etc. For example, event processor 218 may query module server 108 for a device 106 activation command.

As is detailed below, module server 108 may include event processor 316 and wireless extension mechanism 114 may include event processor 820. One or more functionalities of event processor 218, event processor 316, and event processor 820 may be equivalent to one another. Hardware module event processor 218, module server event processor 316, and wireless extension mechanism event processor 820 may mirror one or more functions of each other. Therefore, although particular functionalities may be described herein in regard to a particular event processor, this is not to be construed as limiting. The functionalities described herein in regard to a particular event processor may additionally, or alternatively, be accomplished another event processor.

In one embodiment, hardware module event processor 218 may be synchronized with the configuration maintained by module server event processor 316. Once configured, hardware module event processor 218 may enable hardware module 102 to function autonomously, regardless of whether it has an active connection to module server 108.

Either, or both, hardware module event processor 218 and module server event processor 316 may cause the transmission of a message based on an event associated with one device 106 to a second device 106. In one embodiment, both the first and second devices 106 may be interfaced with the same hardware module 102, either via separate I/O channel ports 216 or the same I/O channel port 216. As such, event processor 218 and/or event processor 316 may cause the relaying of data between two or more devices 106 interfaced with the same hardware module 102.

Module Server

Module server 108 may relay data and instructions between hardware module 102 and access medium 110 or one or more additional hardware modules 102. Module server 108 may be located remotely from hardware module 102, but need not be. Module server 108 may include server controller mechanism 310, one or more module connections 302, one or more access medium connections 304, authentication data 306, user account data 312, transaction identifying mechanism 314, transaction logging mechanism 308, and event processor 316.

Server controller mechanism 310 may enable the flow of data amongst the various components of module server 108.

A module connection 302 may be a socket waiting and listening for incoming communication from hardware module 102. Module connection 302 may enable the pulling and pushing of data between module server 108 and hardware module 102 (and, in turn, device 106). Access medium connection 304 is a socket used by module server 108 to communicate with access medium 110. An access medium connection 304 may wait and listen for incoming communication from access medium 110 and may receive conventional requests from Web services, such as Hypertext Transfer Protocol (HTTP) requests. For example, an access medium connection 302 may receive communication originating from a web browser or an automated Common Gateway Interface (CGI) script, desktop application, Web service API, or mobile application. In one embodiment, module connections 302 and access medium connections 304 wait and listen on different ports to ensure proper communication.

Module server 108 may maintain authentication data 306, which may include information pertinent to module identifiers (e.g., serial numbers). Authentication data 306 may include a record of all module identifiers for all hardware modules 102 distributed by the MBDIS service provider. Authentication data 306 may include data pertaining to encryption. For example, when hardware module 102 initiates a connection with module server 108, server controller mechanism 310 may access authentication data 306 to locate a module identifier and its corresponding encryption key to authenticate the connection. If the module identifier is located and the encryption is successful, hardware module 102 may interface with module server 108 and, in turn, access medium 110. Alternatively, if a corresponding module identifier is not found or encryption fails, server controller mechanism 310 may close the connection.

Module server 108 may include transaction logging mechanism 308 to record transactions with one or more hardware modules 102. Transaction logging mechanism 308 may be configured to record all transactions that are handled by module server 108 and/or those indicated by the configurations established via module server event processor 316 or hardware module event processor 218. The recorded data may be employed to analyze system data, such as to create charts, plots, or calculate values for record-keeping or event triggering.

Module server 108 may include transaction identifying mechanism 314. As described in detail below, transaction identifying mechanism 314 may associate a transaction identifier with each transmission sent to hardware module 102 to ensure successful interaction between module server 108 and hardware module 102.

Module server 108 may maintain user account data 312, which may include data pertaining to user accounts for individuals who have registered their hardware modules 102 with MBDIS 100. A user account may include various information associated with the user, such as contact information (name, mailing address, email address, phone numbers, latitude/longitude, etc.), information particular to the user's hardware module(s) 102 (model data, make data, a module identifier, etc.), authentication information (e.g., username and password), financial account information (e.g., credit card numbers, etc.), device identifiers for devices 106 (e.g., MAC addresses, IP addresses, etc.) etc. An individual may create a user account prior to initializing his hardware module 102. To create a user account, the user may provide the MBDIS service provider with the necessary information via a Web site, email, mail, verbally (e.g., via a customer service representative), fax, etc.

As aforementioned, module server 108 may include event processor 316. Event processor 316 may push a message to access medium 110 or second hardware module 102 per an event that has occurred at device 106 that is interfaced with a first hardware module 102. This configuration may enable a user to monitor the performance of device 106 in real time. In one scenario, access medium 110 may be an email service, a text messaging service (e.g., Short Message Service (SMS), etc.), a social network service, etc. For example, if device 106 is a thermometer, event processor 316 may push a message to a social networking service, such as Facebook, when the thermometer reaches a certain temperature, and the temperature data may be displayed as a status update. As another example, the temperature data may be sent to an email service and the user may receive the data in an email message. As with hardware module event processor 218, module server event processor 316 may transmit messages on a scheduled, periodic basis. For example, event processor 316 may transmit an activation command to hardware module 102 on a scheduled basis. In addition to pushing messages, event processor 316 may provide data or a command when requested by access medium 110 or hardware module 102.

A user may access his user account via, for example, the MBDIS Web site and configure one or more triggers and corresponding action(s) for his registered hardware module(s) 102. As mentioned above, the user may initiate a synchronization process whereby module server event processor 316 settings are synchronized with those of hardware module event processor 218, thereby configuring hardware module 102.

The synchronization process may enable a user to configure hardware module 102 to poll module sever 108 for data periodically, such as at a particular time or on a particular schedule. For example, the user may access his user account to configure hardware module 102 to query module server 108 every fifteen minutes. The synchronization process may be used to instruct hardware module 102 to issue a query related to device 106, such as a request for data or a command. For example, the user may configure hardware module 102 to query module server 108 for activation commands. After the user has configured the polling setting, module server 108 may transmit this instruction, including the appropriate device identifier, to hardware server 102, where it may be stored, thereby configuring hardware module 102 to issue query per the established setting. If hardware module 102 is enabled to store a device identifier, the user may configure hardware module 102 to generate and transmit a message (e.g., an activation message) to an interfaced device 106 without polling module server 108 for an activation command).

Regarding communication between a first hardware module 102 and a second hardware module 102, event processor 316 may provide instructions to the second hardware module 102 based on an event that occurred at the first hardware module 102. For example, event processor 316 may receive temperature data from a thermometer device 106 interfaced with a first hardware module 102 and, if the temperature data indicates a temperature higher than a certain threshold, event processor 316 may send a message to a second hardware module 102 instructing it to activate an interfaced cooling device 106. Event processor 316 may act in a similar fashion to relay messages between two or more devices 106 interfaced with the same hardware module 102. For instance, event processor 316 may receive temperature data from thermometer device 106 interfaced with one I/O channel port 216 and send a message to a cooling device 106 interfaced with a second I/O channel port 216 on the same hardware module 102. In another example, a device 106 interfaced with hardware module 102 may be a data storage medium and the user may employ the data storage medium to record data regarding a second device 106 interfaced with a different I/O channel port 216 or another hardware module 102.

In addition, or instead of, sending a message to access medium 110 or hardware module 102, event processor 316 may send data to transaction logging mechanism 308. The user may employ this configuration when he wishes to, for example, record data from device 106, but does not desire real-time monitoring. Additionally, transaction logging mechanism 308 may enable various visualization processes so that data recorded via event processor 316 may be analyzed. For example, data recorded by transaction logging mechanism 308 may be accessible via access medium 110, such as a Web widget that may display the recorded data as a chart or graph.

Event processor 316 may be enabled to transmit data to an external data store for recordation, analysis, etc.

Access Medium

Access medium 110 may be a mechanism by which a user may interact, via module server 108, with a device 106 interfaced with hardware module 102. For example, access medium 110 may be an API, a Web service, a Web interface, etc. As aforementioned, via access medium 110, a user may control or monitor device 106. For example, access medium 110 may request data from device 106, translate data generated by device 106 into a useful syntax and display it, push a command to device 106, activate an inactive device 106, etc. Access medium 110 may be provided by portable, client-side scripting that allows for embedding control and monitoring resources into Web sites, mobile device applications and widgets, Web service feeds, social networks, Web service APIs, etc. Access medium 110 interpret data received from device 106 and present the data to users and Web services in current and appropriate scales, formats, and syntaxes. For example, access medium 110 may receive data from a thermometer device 106 and present that data in degrees Fahrenheit or Centigrade. Access medium 110 may receive data based upon push data transmission initiated by event processor 218/316/820, may request data itself, may access data recorded in transaction logging mechanism 308 (e.g., to display such logged data a chart, graph, etc.), etc.

Additionally, access medium 110 may allow a user to configure hardware module 102 and/or interfaced devices 106 via module server 108. For example, the user may set an I/O channel port 216 to normal mode or smart mode.

Access medium 110 may be accessible via Internet-enabled devices, such as personal computers (e.g., desktop computer, laptop computers, tablet computers, etc.) and mobile devices (e.g., mobile phones, smart phones, personal digital assistants, etc.).

To enhance user convenience, the MBDIS service provider may offer one or more access mediums 110 to users. For example, a user may visit an MBDIS Web site and access ready-made Web widget coding that may be input into the coding of a Web page in order to control or monitor device 106 from the Web page. The MBDIS service provider may provide access mediums 110 for common functionalities, such as light levels, temperature display, weather information, etc. The MBDIS sever provider may provide a convenient interface by which a user may create a customized access medium 110. For example, an MBDIS Web site may include a point and click interface, a wizard interface, or another form of customized programming interface by which a user may generate a customized access medium 110 suitable to the user's needs and/or the particular functionality of device 106.

Hardware Module Initialization

In order for a user to employ to hardware module 102, he may be required to authenticate it with module server 108, thereby linking hardware module 102 to a user account. The MBDIS service provider may employ an authentication process in order to confirm that an actual individual wishing to employ a particular hardware module 102 is initializing the hardware module 102, rather than an automated process. This may ensure that hardware module 102 is being employed with the user's permission.

To begin initialization, the user may connect hardware module 102 to network 104 (step 402). As aforementioned, the user may connect hardware module 102 to network 104 via local network 112. Hardware module 102 may then transmit a connection request to the module server 108 (step 404). Module server 108 may be configured to listen to network 104 and enabled to await such requests. Once a connection has been established between module server 108 and hardware module 102 (step 406), connectivity status display 214 may indicate this (e.g., by displaying a green light).

The user may then register a module identifier associated with hardware module 102 with module server 108 (step 408). In one embodiment, the user may register a module identifier by associating it with a user account maintained by module server 108. Module identifier may be, for example, a serial number included on hardware module 102 and/or documentation provided to the user when hardware module 102 was acquired. The module identifier may be included in firmware maintained by hardware module 102. In addition to registering the module identifier, the user may register contact information, authentication information (e.g., username and password), financial account information, etc.

The registration process may involve the user establishing a user account with the MBDIS service provider. The user may establish the user account prior to the initialization. Additionally, the user may be allowed to register multiple hardware modules 102 with the same user account and, therefore, may employ the initialization process to add an additional hardware module 102 to an existing user account. In one embodiment, the user may establish a user account by employing a computing device (e.g., personal computer, mobile device, etc.) to access a Web site linked to module server 108. Once at the Web site, the user may register the module identifier and other information. In alternate embodiments, the user may establish and/or augment a user account via other methods. For example, a user may verbally establish an account by calling the MBDIS service provider and providing the necessary information to a customer service representative. As another example, a user may complete a registration form and mail, email, or email it to the MBDIS service provider.

Once the user has registered the module identifier with his user account, he may activate initialization mechanism 210 (step 410). For example, if initialization mechanism 210 is an external button, the user may hold the button for particular amount of time (e.g., five seconds). Initialization status display 212 may indicate to the user that initialization has commenced.

Hardware module 102 may receive authentication data transmitted from module server 108 (step 412). Hardware module 102 may display this authentication data to the user via initialization status display mechanism 212. For example, module server 108 may transmit a series of digits to hardware module 102 and initialization status display mechanism 212 may display the digits to the user.

The user may provide the transmitted authentication data to the MBDIS service provider (step 414). In one embodiment, the user may enter the displayed authentication data at a Web site linked to module server 108. The user may do so during the same session with which he registered the module identifier. In alternate embodiments, the user may provide the authentication data by verbally relating it to a customer service representative (e.g. via telephone), or by mailing, emailing, or faxing the authentication data to the MBDIS service provider.

The provided authentication data is relayed to module server 108, which analyzes it to determine if it is valid. If the provided authentication data is incorrect, the user may be requested to provide it again. If the user cannot successfully do so, hardware module 102 may receive a termination signal from module server 108 (step 416) and hardware module 102 may not be activated. If the authentication data is deemed valid, hardware module 102 may receive a signal from module server 108 indicating that the initialization is complete (step 418). Hardware module 102 may now have an active connection with module server 108 and initialization display mechanism 212 may signal the end of initialization.

Communication Between the Hardware Module and the Module Server

As aforementioned, the configuration of MBDIS 100 may enable hardware module 102 to serve as a client rather than a server. Hardware module 102 may issue transmissions via network 104 to module server 108 without module server 108 replying immediately. In one embodiment, Internet Protocol (IP), such as HTTP protocol, may be used for communication between hardware module 102 and module server 108. Hardware module 102 may act as a client and issue requests to module server 108. Module server 108 need not reply immediately, thereby allowing hardware module 102 to send another request to push data to module server 108. Although it may, hardware module 102 need not request anything from module server 108. Once hardware module 102 makes its initial connection, requests may be generated by module server 108. Hardware module 102 may push data to module server 108 and may do so without being solicited. In one embodiment, hardware module 102 may transmit HTTP POST requests, which are not cached by web proxy servers. Furthermore, the use of HTTP POST transmissions with no immediate reply from module server 108 enables web proxy servers to manage the communication between hardware module 102 and module server 108 as standard HTTP traffic, thereby alleviating unnecessary burden upon MBDIS 100.

Figure 5:
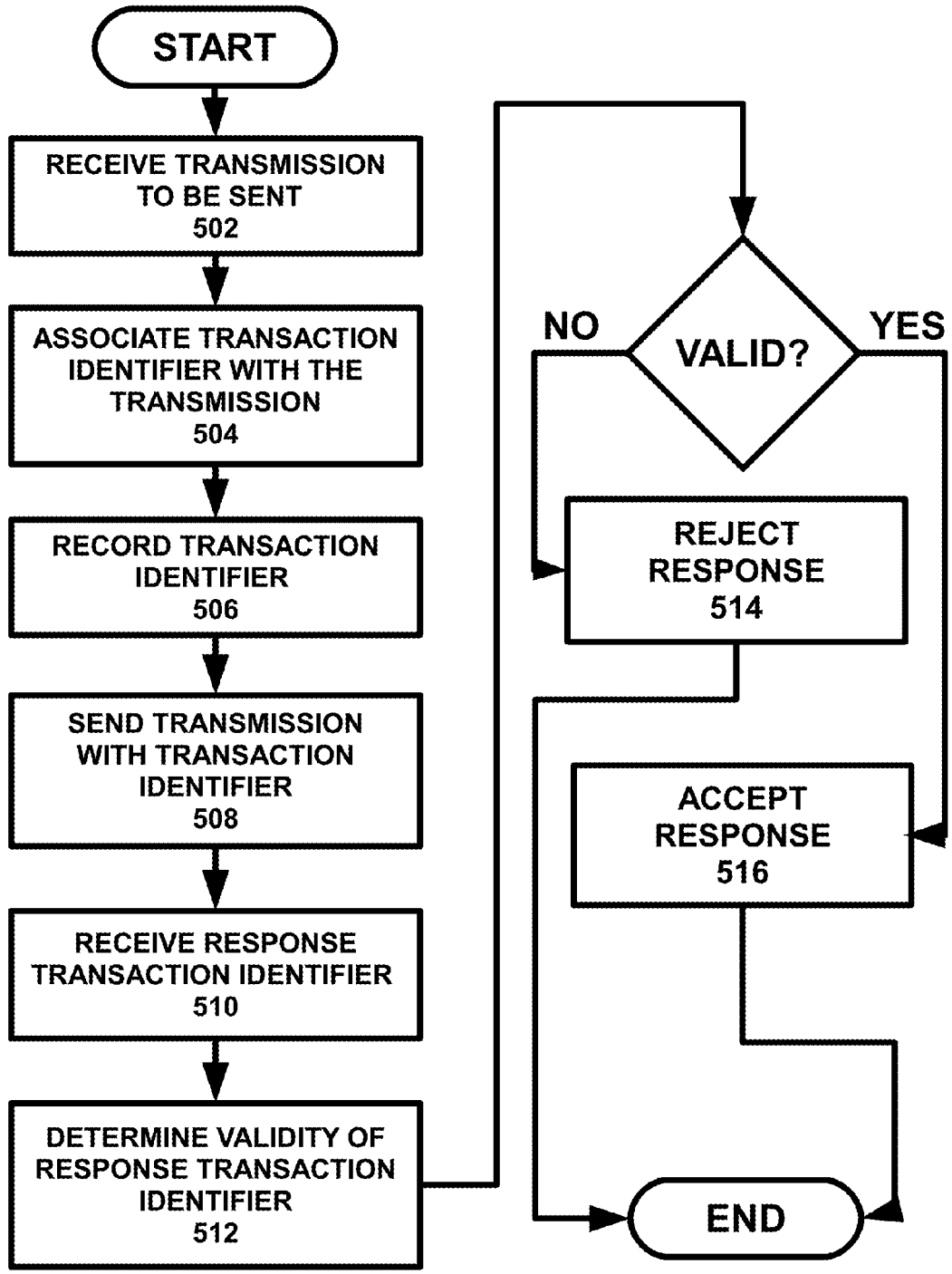
FIG. 5 illustrates a flowchart of a process of a module server communicating with a hardware module according to an example embodiment.

Module server 108 may manage numerous connections simultaneously. Since module server 108 may request data from hardware module 102 in addition to hardware module 102 being able to send data to module server 108, there is the possibility that data messages may cross in transit. As illustrated by FIG. 5, transaction identifying mechanism 314 may prevent any problem that may occur due to such a situation. Server controller mechanism 310 may receive a transmission to be sent to hardware module 102 (step 502). For example, a user may employ access medium 110 to send control instructions to hardware module 102 or event processor 316 may send data to hardware module 102 per an event triggered by device 106. Transaction identifying mechanism 314 of module server 108 may associate a transaction identifier with each transmission to be sent to hardware module 102 (step 504). Transaction identifying mechanism 314 may record this transaction identifier (step 506). For example, module server 108 may issue a unique, six digit transaction identification code with each request sent to hardware module 102. Module server 108 may send the transmission with its associated transaction identifier to hardware module 102 (step 508). Module server 108 may receive a response transmission from hardware module 102 and the response may include a transaction identifier, such as in a Uniform Resource Identifier (step 510). Transaction identifying mechanism 314 may compare the received transaction identifier with those it has recorded to determine if the response is a valid transmission (step 512). If the received transaction identifier does not match one recorded, the response may be rejected (step 514). If the received transaction identifier matches on record, the response is deemed a valid transmission and accepted (step 516). As aforementioned, hardware module 102 may transmit data unsolicited. For such transmissions, module controller mechanism 204 of hardware module 102 may associate a particular transaction identifier with all unsolicited transmissions and transaction identifying mechanism 314 may be configured to treat all such transmissions as valid. For example, hardware module 102 may use the transaction identifier "000000" for all unsolicited transmissions.

For example, in one scenario, a message from hardware module 102 may be formatted as follows:
POST/001234 HTTP/1.1
Host: www.hardwareserver.com
Content-Encoding: application/octet-stream
Cache-Control: no-transform, no-store, private
Content-Length: 15
Message: Hh8S1ykd08Mp82g
In the example above, the transaction identifier is 001234.

As another example, a request from module server 108 to hardware module 102 may be formatted as the following:
HTTP/1.1 200 OK
Date: Mon, 14 Jul. 2008 04:28:18 GMT
Cache-Control: no-transform, no-store, private
Content-Encoding: application/octet-stream
Content-Length: 23
Message: uN05aJdnaSneH96hu6dsll
In this example, the transaction identifier is included, and encrypted, in the message body (e.g., 059611).

Messages Pushed by the Hardware Module to the Module Server

As mentioned, hardware module 102 may generate and transmit messages on its own volition. For example, rather than module server 108 periodically polling hardware module 102 for the status of a digital input, event processor 218 of hardware module 102 may push a message at the instant it receives an indication from an I/O channel port 216 that an event has occurred at an interfaced device 106. As another example, event processor 218 may periodically poll module server 108 for any received requests it has stored. Hardware module 102 may push data to module server 108 or a device 106 on a separate I/O channel port 216 via auto-messaging, triggered messaging, a smart device push, etc. Auto-messaging and triggered messaging may be accomplished via an I/O channel port 216 set to normal mode, while a smart device push may be handled via smart mode.

To push data via auto-messaging, event processor 218 of hardware module 102 may be configured to send the state of an I/O channel port 216 (and therefore an interfaced conventional device 106A) automatically at a set schedule. For example, an analog input value may be sent every fifteen seconds. Each I/O channel port 216 may be set to send either its analog input or digital input at a user determined schedule. Each I/O channel port 216 auto-message interval may be set independently.

Data may be pushed via triggered messaging when the state of a digital or analog input from an interfaced conventional device 106A changes. Each I/O channel port 216 may have a configurable trigger and reset value. Hardware module 102 may send a message when an input reaches a certain level.

If an I/O channel port 216 is set to smart mode, hardware module 102 may transmit an unsolicited message from smart device 106B. The message may be sent on behalf of the configuration of smart device 106B itself. For example, particular events, activities, actions, etc. that occur via smart device 106B may initiate the transmission of data to hardware module 102 and in turn module server 108 or another device 106 interfaced with a separate I/O channel port 216.

Waking-on-LAN Via the Hardware Module and the Module Server

Hardware module 102 and module server 108 may be employed to enable Wake-on-LAN (WOL) procedures. It is to be understood that "WOL" as used herein encompasses wired network configurations, wireless (e.g., Wake-on-Wireless LAN) network configurations, or combinations thereof. Although the description herein typically describes activating an inactive device 106 in terms of device 106 interfaced with hardware module 102 via local network 112, this is not to be construed as limiting. In alternate embodiments, the process described herein may be employed to activate device 106 interfaced with hardware module 102 directly or via network 104. Furthermore, although module server 108 is described typically herein as being remote from local network 112, hardware module 102, and/or device 106, this is not to be construed as limiting, and module server 108 may be located locally.

The configuration described herein consumes significantly less power than traditional WOL arrangements and may allow all unnecessary devices to be inactive until their services are required (thereby consuming significantly less power than a typical WOL system). For example, instead of providing power to an entire computer system, power need only be provided to hardware module 102 and an activation component of an inactive device 106, such as a network interface card (NIC).

Figure 6:
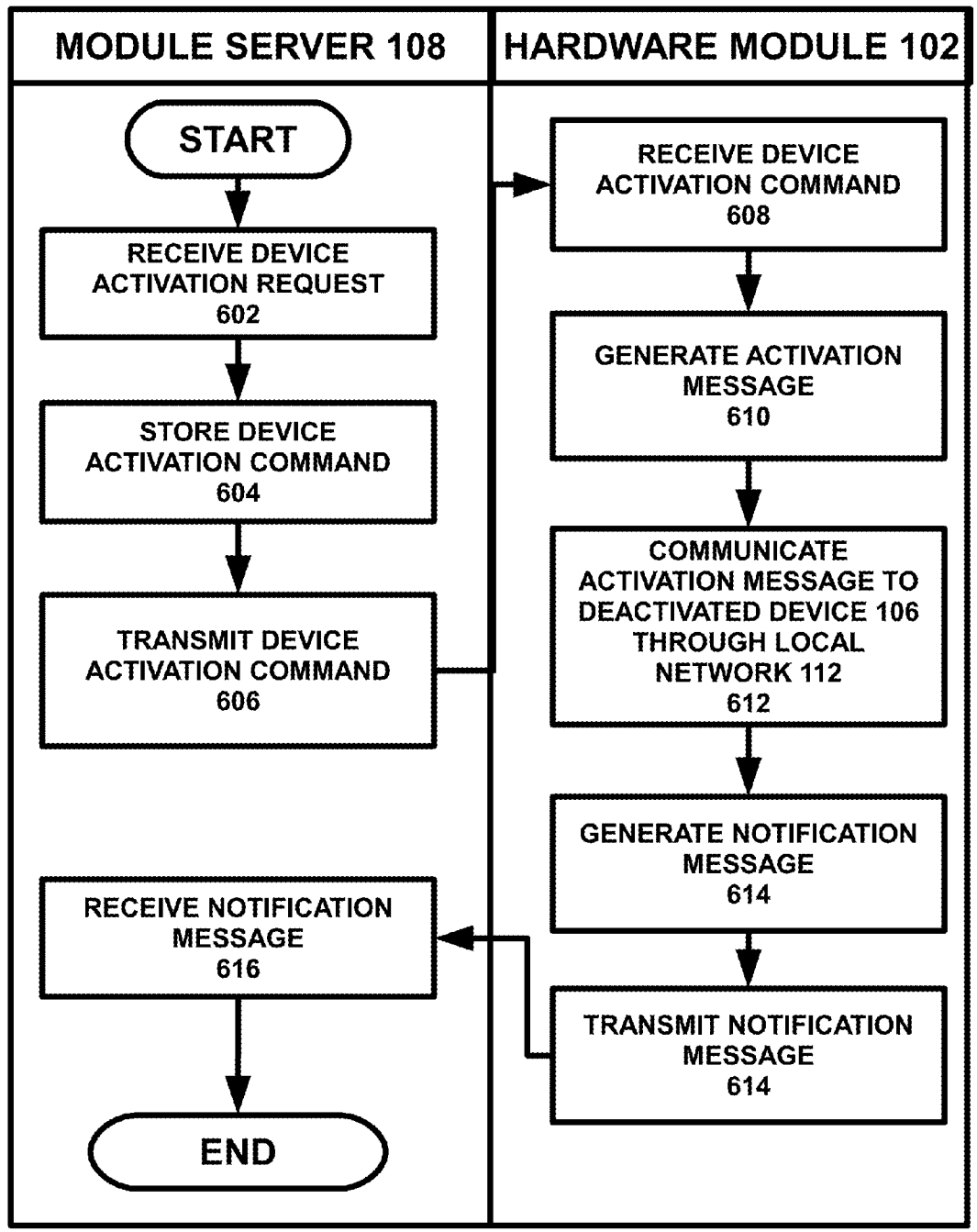
FIG. 6 illustrates a flowchart of a process of activating a device via a hardware module and a module server according to an example embodiment.

FIG. 6 depicts an embodiment of activating device 106, such as a computer, via hardware module 102 and module server 108. Module server 108 may receive a request from access medium 110 to instruct hardware module 102 to activate an inactive device 106 (step 602). As module server 108 may be connected to the Internet or another WAN, the request may be initiated from a location remote from the inactive device 106 and local network 112.

A user may issue the request manually. For example, the user may select a button on a Web widget interface to issue a request to activate an inactive device 106. The associated device identifier may be stored in an appropriate user account and module server 108 may access it per the request. As another example, the user may establish a reference for a stored device identifier and provide this reference to activate device 106. For example, the user may establish the reference "printer1" for the MAC address "0123456789ab," and transmit a message including "printer1" via access medium 110. The activation request also may be sent via an automated mechanism. For example, a user may configure access medium 110 to initiate an activation request at a particular time, set a schedule for activation requests, etc. Alternatively, a device may initiate the activation request.

In another scenario, the activation request may include the necessary device identifier. For example, a user may enter a MAC address into a text box included in a Web widget and the MAC address may be sent to module server 108.

Once the activation request has been received, module server 108 may store a device activation command including the device identifier until it is to be sent to hardware module 102 (step 604). As aforementioned, hardware module 102 may connect with module server 108 outside local network 112 via a TCP/IP connection. The device activation command may be transmitted to hardware module 102 immediately, at a particular time increment, on a schedule, or when it is requested by hardware module 102 (step 606). Hardware module 102 may be configured to periodically poll module server 108 for instructions, such as at a set interval, rather than wait for module server 108 to push an activation command to it. Hardware module 102 may store device identifiers for one or more networked devices 106 and may poll module server 108 by transmitting a query including such an identifier. If module server 108 has stored a corresponding device activation command, it may send it to hardware module 102.

After receiving the device activation command (step 608), hardware module 102 may generate an activation message to be sent to the inactive device 106 (step 610). The activation message may include the device identifier included in the activation command. In this scenario, the activation message may be a "magic packet."

The activation message may be communicated by hardware module 102 to the inactive device 106 through local network 112 (step 612). For example, hardware module 102 may broadcast a magic packet to other networked devices 106 via a router. The inactive device 106 may not be entirely inactive and may have a component that is kept operational to receive activation messages. For example, the activation message may be received via an NIC. Even though this component may use a small amount of power, it may be considerably less than the amount required to power device 106 entirely. The inactive device 106 may then activate per the received activation message.

Hardware module 102 may generate a notification message regarding its transmission of the activation message (step 614) and transmit the notification message to module server 108, thereby indicating that the activation message has been sent (step 614). Module server 108 may receive the notification message (step 616) and in turn notify access medium 110. The user may confirm that device 106 has been activated by attempting to access it.

In one scenario, hardware module 102 may be configured to generate and issue an activation message without polling module server 108. As aforementioned, the user may access his user account to configure hardware module 102 to perform one or more actions. As hardware module 102 may be configured to store a device identifier itself, its event processor 218 may cause hardware module 102 to generate and transmit an activation message with a stored device identifier at a predetermined time, per a predetermined schedule, etc.

Wireless Extension Mechanism

FIG. 7 illustrates a general architecture overview of an exemplary MBDIS 100 in which hardware module 102 interacts and is interfaced with device 106 via one or more wireless extension mechanisms 114 according to an embodiment. The components depicted in FIG. 7 may interact with one another as previously described. In one embodiment, hardware module 102 may be interfaced with medium adapter 116 to enable it to communicate wirelessly with device 106. In another embodiment, hardware module 102 may include a wireless transmitter and/or receiver and need not be interfaced with medium adapter 116 in order to interact with device 106 wirelessly. In one embodiment, device 106 may be interfaced with wireless extension mechanism 114 in order to communicate wirelessly with hardware module 102. In another embodiment, device 106 may include a wireless transmitter and/or receiver and need not be interfaced with wireless extension mechanism 114 in order to interact with hardware module 102 wirelessly. Furthermore, wireless extension mechanism 114 may be interfaced with medium adapter 118 to enable wireless communication and/or wireless extension mechanism 114 may include a wireless transmitter and/or receive and need not be interfaced with medium adapter 118 in order to communicate wirelessly. Although wireless extension mechanism 114 may be described herein as interacting with hardware module 102, this is not to be construed as limiting and it is to be understood that wireless extension mechanism 114 may be interacting with hardware module 102 either directly or via medium adapter 116 and/or medium adapter 118.

As with the components described in regard to FIG. 1, components of FIG. 7 are herein referenced as "systems," "mechanisms," "modules," "processors," etc. This is not to be construed as limiting and it is to be understood that each component may include the necessary hardware, which may operate alone or under direction of appropriate firmware and/or software to enable the processing, storing, communicating and/or receiving of data. For example, a component may include one or more computer processors, computer servers, data stores, electronic components, storage mediums, memory, etc. Although only a limited number of each component is depicted, this is for illustrative purposes only and is not to be construed as limiting. For example, one hardware module 102 may interact with multiple wireless extension mechanisms 114 and, in turn, multiple devices 106.

Figure 8:
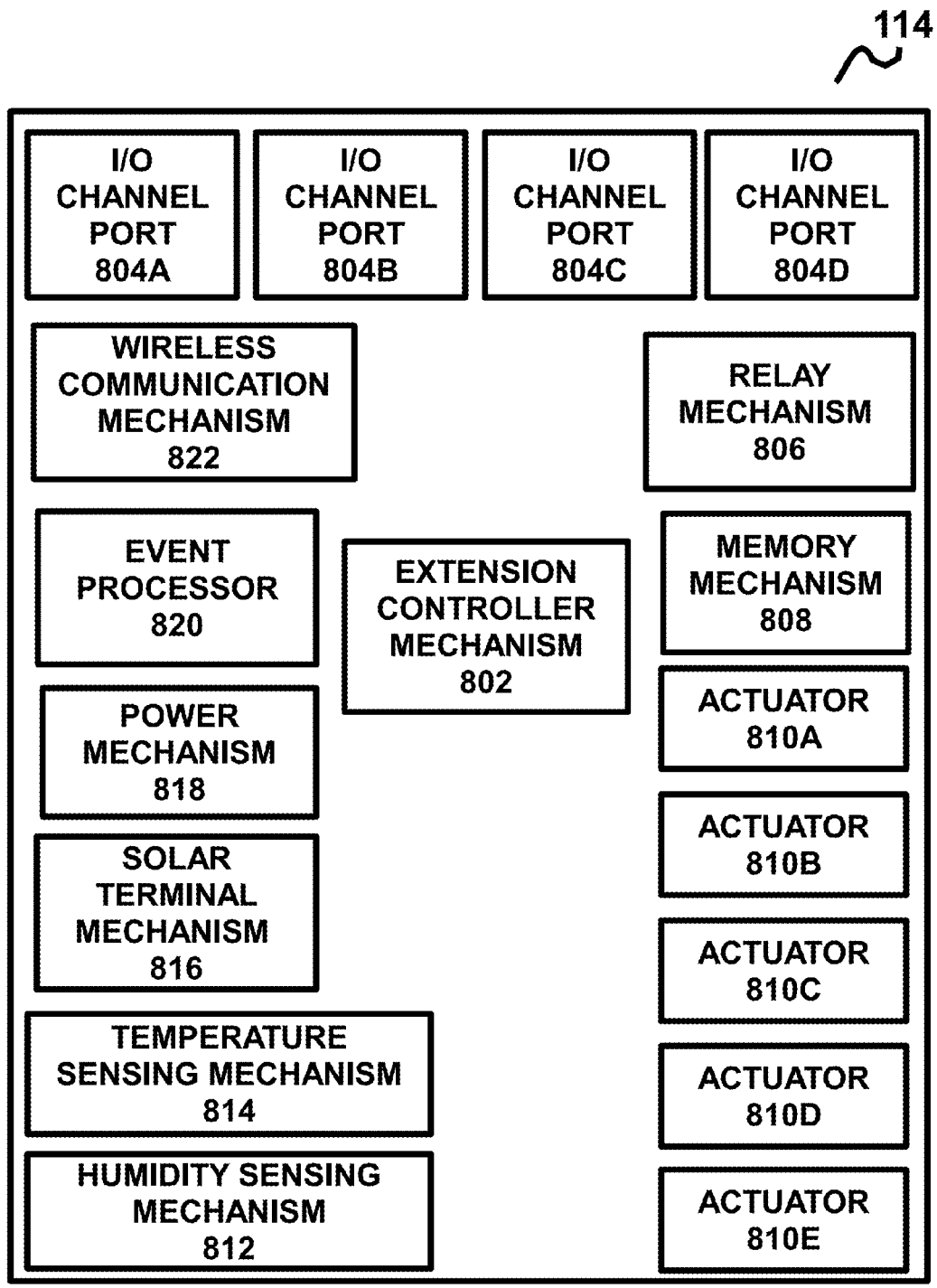
FIG. 8 illustrates a wireless extension mechanism enabled to allow a device to interface wirelessly with a hardware module according to an example embodiment.

FIG. 8 illustrates an exemplary wireless extension mechanism 114 enabled to allow device 106 to interact wirelessly with hardware module 102 according to an embodiment. Via module server 108 and hardware module 102, one or more I/O channel ports 804 of wireless extension mechanism 114, and in turn, device 106, may be monitored and/or controlled via access mechanism 110 (e.g., a Web interface, mobile app, API, etc.). As mentioned above, hardware module 102 may be enabled to interact with wireless extension mechanism 114 via medium adapter 116 and/or via an included wireless transmitter and/or receiver. As illustrated by FIG. 8, in one embodiment, wireless extension mechanism 114 may include extension controller mechanism 802, one or more I/O channel ports 804, relay mechanism 806, memory mechanism 808, one or more actuators 810, humidity sensing mechanism 812, temperature sensing mechanism 814, solar terminal mechanism 816, power mechanism 818, event processor 820, and wireless communication mechanism 822

Wireless extension mechanism 114 may serve as a wireless extension for digital inputs, digital outputs, analog inputs, analog outputs, the receipt and transmission of serial data, etc. In one embodiment, hardware module 102 and wireless extension mechanism 114 may be configured to function autonomously to perform local monitoring and/or control without network connectivity.

Wireless extension mechanism 114 may include extension controller mechanism 802 that may communicate with the components of wireless extension mechanism 114 and/or hardware module 102 in order to direct the flow of data, monitor and/or direct the activity of components, etc. For example, extension controller mechanism 802 may communicate with wireless communication mechanism 822 to enable the communication of data between wireless extension mechanism 114 and hardware module 102. In one embodiment, extension controller mechanism 802 is a microcontroller, microprocessor, etc. For example, extension controller mechanism 802 may enable an I/O channel port 804 to monitor voltage of device 106.

Wireless communication mechanism 822 may enable wireless extension mechanism 114 to communicate with hardware module 102, and thereby transmit and receive data from hardware module 102, and/or, in turn, module server 108. In one embodiment, wireless communication mechanism 822 may be configured to interact with medium adapter 118, an antennae or other medium attached to or included with wireless extension mechanism 114 in order to enable wireless extension mechanism 114 to communicate with hardware module 102.

Wireless extension mechanism 114 may include memory mechanism 808 in order to store settings, data, etc. For example, memory mechanism 808 may be non-volatile RAM.

Power mechanism 818 may enable the distribution of power to wireless extension mechanism 114. For example, power mechanism 818 may enable and monitor the receipt of electricity to power wireless extension mechanism 114 from an electrical cord, battery, solar terminal, etc. In one embodiment, wireless extension mechanism 114 may include solar terminal mechanism 816 to enable wireless extension mechanism 114 to function completely or partially based upon solar power.

Wireless extension mechanism 114 may include one or more I/O channel ports 804 (e.g., I/O channel ports 804A-804D). For example, one or more I/O channel ports 804 may be configured to employ digital input and/or output, analog input and/or output, serial data input and/or output, pulse counting and/or generation, and frequency counting and/or generation, audio input and/or output, video input and/or output, etc. An I/O channel port 804 may be configured to interact with and/or correlate to an I/O channel ports 216 and/or expansion port 220. In one embodiment, one or more I/O channel ports 804 may be mapped to one or more variables maintained by hardware module 102 and/or module server 108, such as those of an I/O channel ports 216 or expansion port 220. I/O channel port 216 variables may be synchronized wirelessly with I/O channel port 804 variables.

Wireless extension mechanism 114 may include a temperature sensing mechanism 814. This may enable wireless extension mechanism 114 to obtain temperature data by itself instead of, or in addition to, for example, a device 106 enabled to monitor temperature. Wireless extension mechanism 114 may include humidity sensing mechanism 812 which may enable wireless extension mechanism 114 to monitor the humidity of its surroundings.

Wireless extension mechanism 114 may include event processor 814. Event processor 814 may be configured to mirror the functionality of event processor 218 and/or event processor 316. For example, event processor 814 may monitor behavior of device 106, initiate an action, push a message via an established schedule, communicate data when requested by access medium 110, poll the module server 108 for data and/or commands, etc. By mapping variables from wireless extension mechanism 114 to hardware module 102, one or more functions associated with event processor 218 and/or event processor 316 may be synchronized with event processor 814. For example, functions concerning local rules and/or actions, data logging, alerting, use of Web widgets, etc. may be enabled. In one embodiment, in addition to, or instead of, enabling such functionalities based upon device 106, event processor 814 may interact with a mechanism included with wireless extension mechanism 114, such as temperature sensing mechanism 814, humidity sensing mechanism 812, etc.

Wireless extension mechanism 114 may include one or more actuators 810 (e.g., actuators 810A-810E) which may enable the configuration of one or more I/O channel ports 804. For example, an actuator 810 may be switched to enable an I/O channel port 804 to function as an analog input to measure a particular amount of voltage on device 106. In another scenario, the analog output voltage of an I/O channel port 804 may be mapped to hardware module 102 variables. For example, the value of hardware module 102 variables may correspond to the output voltage in millivolts DC (e.g., a hardware module variable value of 2500 may provide an output voltage of 2500 mV or 2.5V DC).

Extension controller mechanism 802 and/or relay mechanism 806 may enable wireless extension mechanism 114 to compensate for differences between wireless extension mechanism 114 and hardware module 102. In one embodiment, I/O channel ports 216 and/or expansion port 220 may operate at a different voltage (e.g., higher, lower, etc.) than I/O channel ports 804. For example, wireless extension mechanism 114 may be designed to operate with lower voltage for power saving reasons. Relay mechanism 806 may enable wireless mechanism extension 114 to operate with minimal power while interacting with device 106. For example, relay mechanism 806 may enable an I/O channel port 804 configured for digital output to operate at a lower voltage than the corresponding, mapped I/O channel port 216. In one embodiment, relay mechanism 806 may not require power to maintain a state. For example, relay mechanism 806 may be a latchable relay that requires no power once it has been switched and may remain in the same state until it is switched again.

Wireless extension mechanism 114 may have one or more modes of operation and, therefore, may serve as a multipurpose device. Wireless extension mechanism 114 may provide added flexibility for user configurations and applications.

The modes of operation of the wireless extension mechanism 114 may be configured by a user adjusting one or more of actuators 810. In one embodiment, each mode may have two states: one for each type of power source. For example, one mode may be for battery power while another may be for mains power. The operation of wireless mechanism extension 114 in each of these states may be different because a user may determine a desired mode of operation based upon the operation's power requirements (e.g., because it may drain the battery quickly, battery power may not provide sufficient or sustainable power, etc.). When running in a low-power state based upon battery power, wireless extension mechanism 114 may operate in an inactive state (i.e., "sleep") and activate (i.e., "wake up") on a periodic schedule and/or to synchronize with hardware module 102 and/or module server 108 before returning to an inactive state. When running in a high-power state (e.g., based upon mains power), wireless extension mechanism 114 may not need to enter into an inactive state and may communicate more frequently. For example, the high-power state may allow for serial communication with hardware module 102. As aforementioned, wireless extension mechanism 114 may include solar terminal mechanism 816 and, depending upon the power provided by solar terminal mechanism 816, may operate in a low-power or high-power state based upon solar power.

Example Mode 1

In one embodiment, one mode may configure wireless extension module 114 to monitor temperature and/or humidity instead of, or in addition, interfacing with one or more devices 106. This mode may enable wireless extension mechanism 114 to operate as a wireless temperature sensor and, optionally, a wireless humidity sensor. In order to communicate data obtained from an internal sensing mechanism, such as temperature sensing mechanism 814 or humidity sensing mechanism 812, an I/O channel port 804 may be disabled so that its value may be mapped to the internal sensing mechanism. For example, an I/O port channel 804 configured for analog input may be disabled so that its value may be mapped to temperature sensing mechanism 814 and/or an I/O port channel 804 configured for digital input may be disabled so that the value from humidity sending mechanism 818 may be mapped to that channel instead. A digital output I/O channel port 804, an analog output I/O channel port 804, and an I/O channel port 804 maintained by relay mechanism 806 may be kept in sync with hardware module 102.

Example Mode 2

In one embodiment, one mode may configure wireless extension module 114 to mimic a set of operations of I/O channel ports 216. In this mode, I/O channel ports 804 may be set to digital output, digital input, analog input, and analog output and may be synchronized with matching variables maintained by hardware module 102. Relay mechanism 806 may ensure necessary synchronization transpires.

Example Mode 3

In one embodiment, one mode may configure wireless extension module 114 to count pulses. I/O channel ports 804 of wireless extension mechanism 114, such as, for example, a pulse counting channel port, a digital output, an analog input, an analog output, may be kept in sync with matching variables on hardware module 102. Relay mechanism 806 may ensure necessary synchronization transpires.

Example Mode 4

In one embodiment, one mode may configure wireless extension module 114 to operate similarly to Example Mode 2 when in a low-power state, but when in a high-power state, wireless extension module 114 may send and/or receive serial messages to and/or from hardware module 102. For example, this mode may enable hardware module 102 to send serial messages received from module server 108 from access mechanism 110 (e.g., a dashboard widget, a serial API, etc.) to device 106 via wireless extension mechanism 114. A serial message may be sent in raw format. For example, a serial message may not be encapsulated for forwarding.

Example Mode 5

In one embodiment, one mode may configure wireless extension module 114 to operate similarly to Example Mode 2 when in a low-power state, but when in a high-power state, wireless extension mechanism 114 may send encapsulated serial messages to hardware module 102 and may receive raw serial messages from hardware module 102. For example, as with Example Mode 4, this mode may enable hardware module 102 to send serial messages received from module server 108 from access mechanism 110 to device 106 via wireless extension mechanism 114. However, unlike Example Mode 4, in this mode, the serial messages sent to hardware module 102, and in turn module server 108 and, in one scenario, access mechanism 110, are sent in an encapsulated format.

Example Mode 6

In one embodiment, one mode may configure wireless extension mechanism 114 to interact with a device 106 that is a rangefinder, such as an ultrasonic rangefinder. This mode is similar to Example Mode 2; however, the digital input of an I/O channel port 804 may be replaced by range readings sent by a rangefinder device 106. For example, a rangefinder device 106 may provide wireless extension mechanism 114 with serial messages representing range.

Medium Adapter Configuration

Hardware module 102 may enable automatic configuration of one or more medium adapters (e.g., medium adapter 116 and medium adapter 118). For example hardware module 102 may enable the configuration of an encryption key, unique codes, I/O channel port settings, etc. This may be accomplished by interfacing each medium adapter with hardware module 102 and instructing hardware module 102 to configure each medium adapter with the same settings (e.g., the same encryption key). A user may instruct hardware module 102 to do so via manual input, access mechanism 110, etc. Once each medium adapter is configured, a user may interface each medium adapter with the appropriate component (e.g., hardware module 102 and wireless extension mechanism 114) and each medium adapter may interact appropriately (e.g., via the established encryption key). Alternatively, a medium adapter may be connected to a computer, a mobile device etc. (e.g., via a USB adapter) and may be configured via software.

Example Hardware Module Implementations

Figure 9:
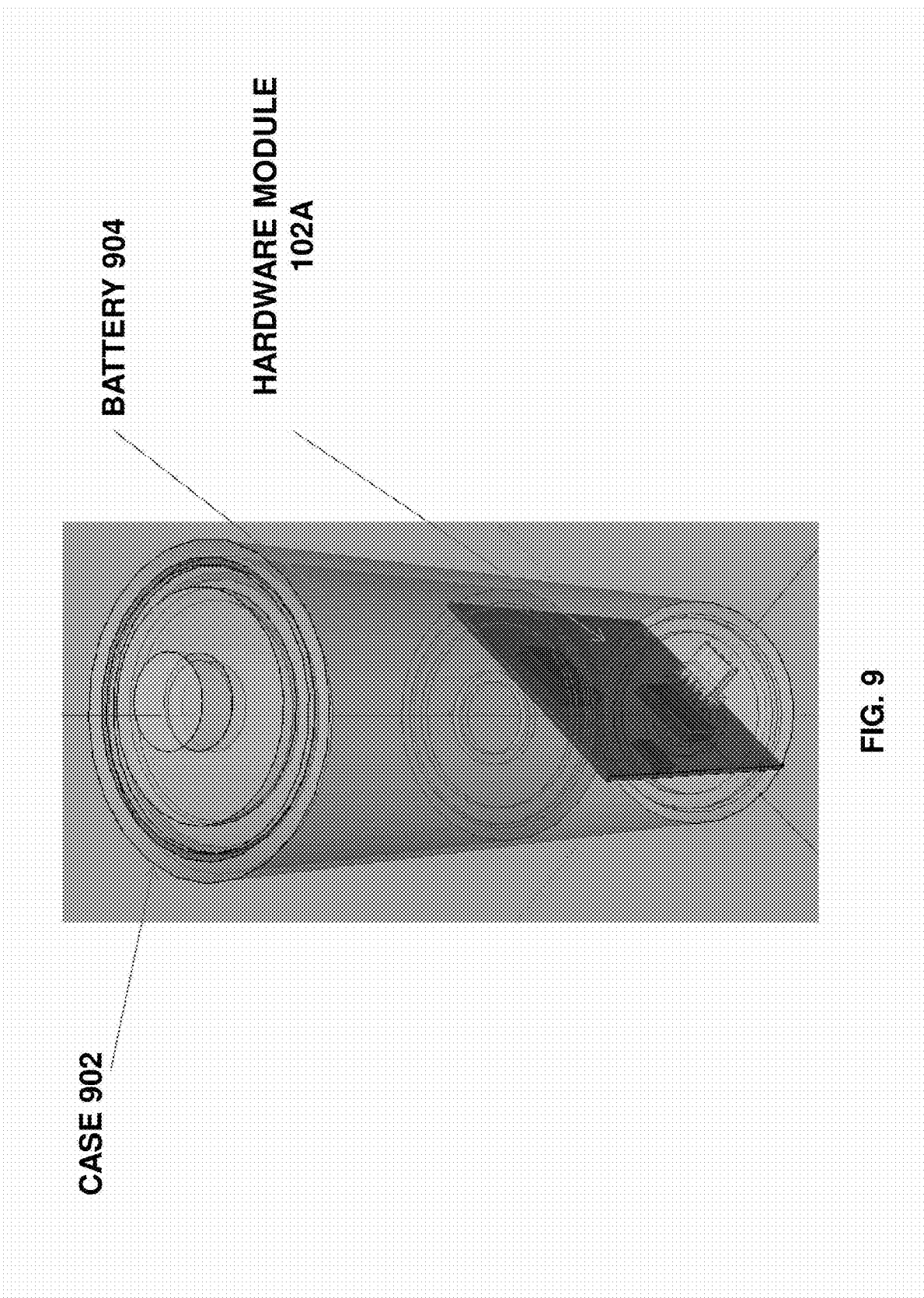
FIG. 9 illustrates an implementation of a hardware module enabled for Internet-based device control or monitoring according to an example embodiment.
Figure 10:
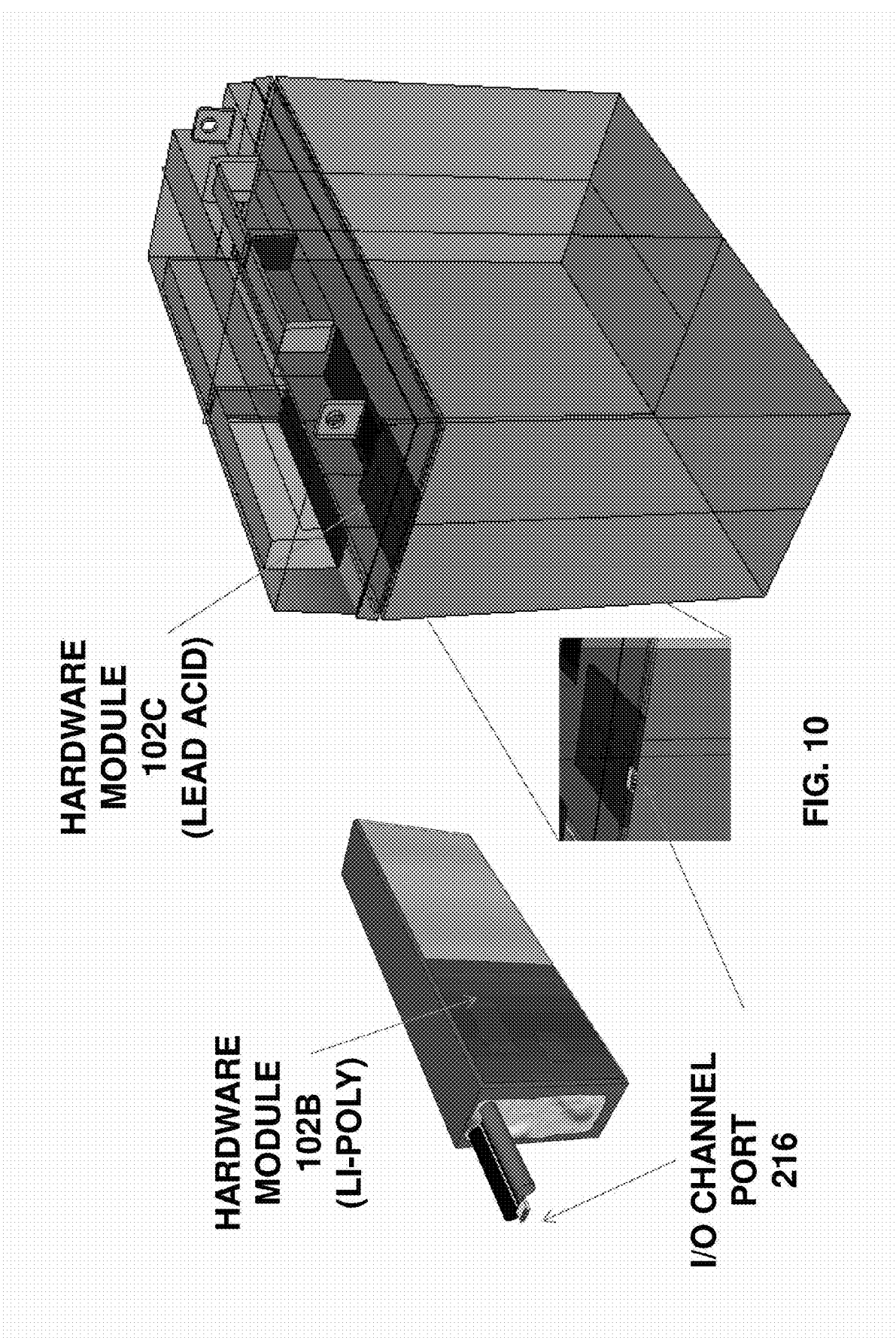
FIG. 10 illustrates an implementation of a hardware module enabled for Internet-based device control or monitoring according to an example embodiment.

As aforementioned, hardware module 102 may be implemented in various structures. FIG. 9 depicts an example implementation of hardware module 102 (i.e., hardware module 102A) incorporated with case 902. In one embodiment, case 902 may function as a medium adapter and enable hardware module 102 to communicate wirelessly, such as via near-field communication (NFC) (e.g., radio frequency, Bluetooth, etc.). In another embodiment, hardware module 102A itself may include a wireless transmitter and/or receiver. Case 902 may be affixed to battery 904, which may be an AA battery, an AAA battery, or any other appropriate battery. Case 902 may be part of battery 904 or may be adapter that may be attached to an existing battery 904. The components included with hardware module 102A may vary from other implementations of hardware module 102 based on need and usefulness. For example, hardware module 102A may not include connectivity status display 214 or initialization status display 212, but may include an internal antenna with an external option, an on/off switch, a temperature sensor, a humidity sensor, a movement sensor, an orientation sensor, an I/O channel port 216, a wireless (Wi-Fi) communication component, an NFC communication component, power line communication component, a buzzer, other sensors, etc. FIG. 10 depicts other example embodiments of hardware module 102, such as hardware module 102 affixed to a Li-Poly battery (i.e., hardware module 102B) or affixed to a lead battery (i.e., hardware module 102C).

Figure 11:
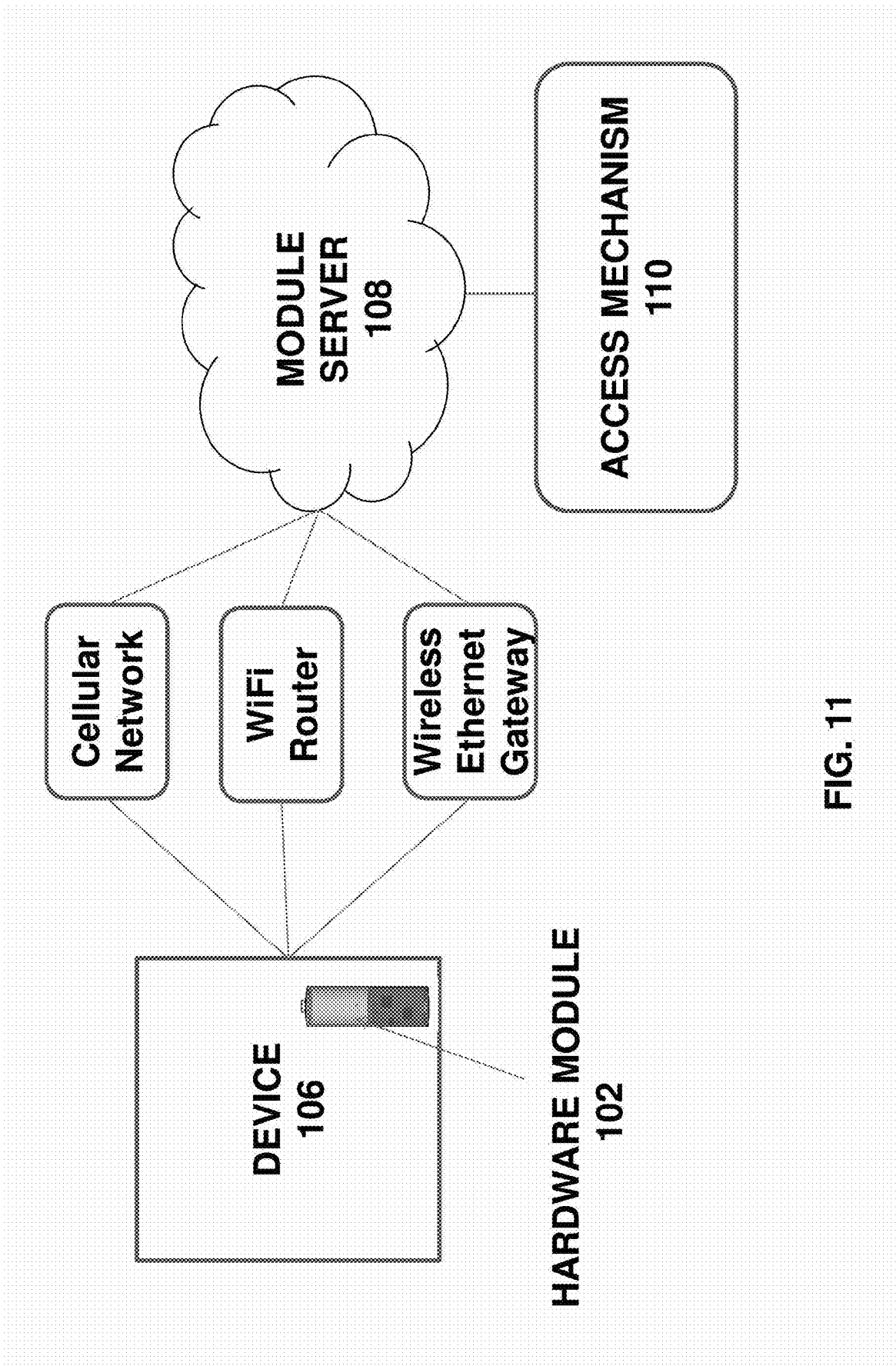
FIG. 11 illustrates system configurations of implementations of a hardware module enabled for Internet-based device control or monitoring according to an example embodiment.

FIG. 11 illustrates example system configurations in which hardware module 102 may be implemented in an embodiment akin to those depicted in FIG. 9 and FIG. 10. In one scenario, NFC communication may be used to program wireless settings, such as service set identification (SSID), passwords, etc. For example, the button push in Wi-Fi Protected Setup configuration may be emulated for SSID and password programming by taking the battery in and out of device 106. In one embodiment, hardware module 102 may power itself via one or more power cells, including the one to which it is affixed.

As depicted in FIG. 9, FIG. 10, and FIG. 11, hardware module 102 may interface with device 106 by being incorporated with device 106 as a battery. For example, by inserting hardware module 102 into a battery slot of device 106, device 106 may be enabled to connect to local network 112 and/or network 104 (e.g., the Internet) and, in turn, interact with module server 108. Hardware module 102 may interface with device 106 via a power line communication, NFC, local wireless (e.g., Bluetooth), etc.

Figure 12:
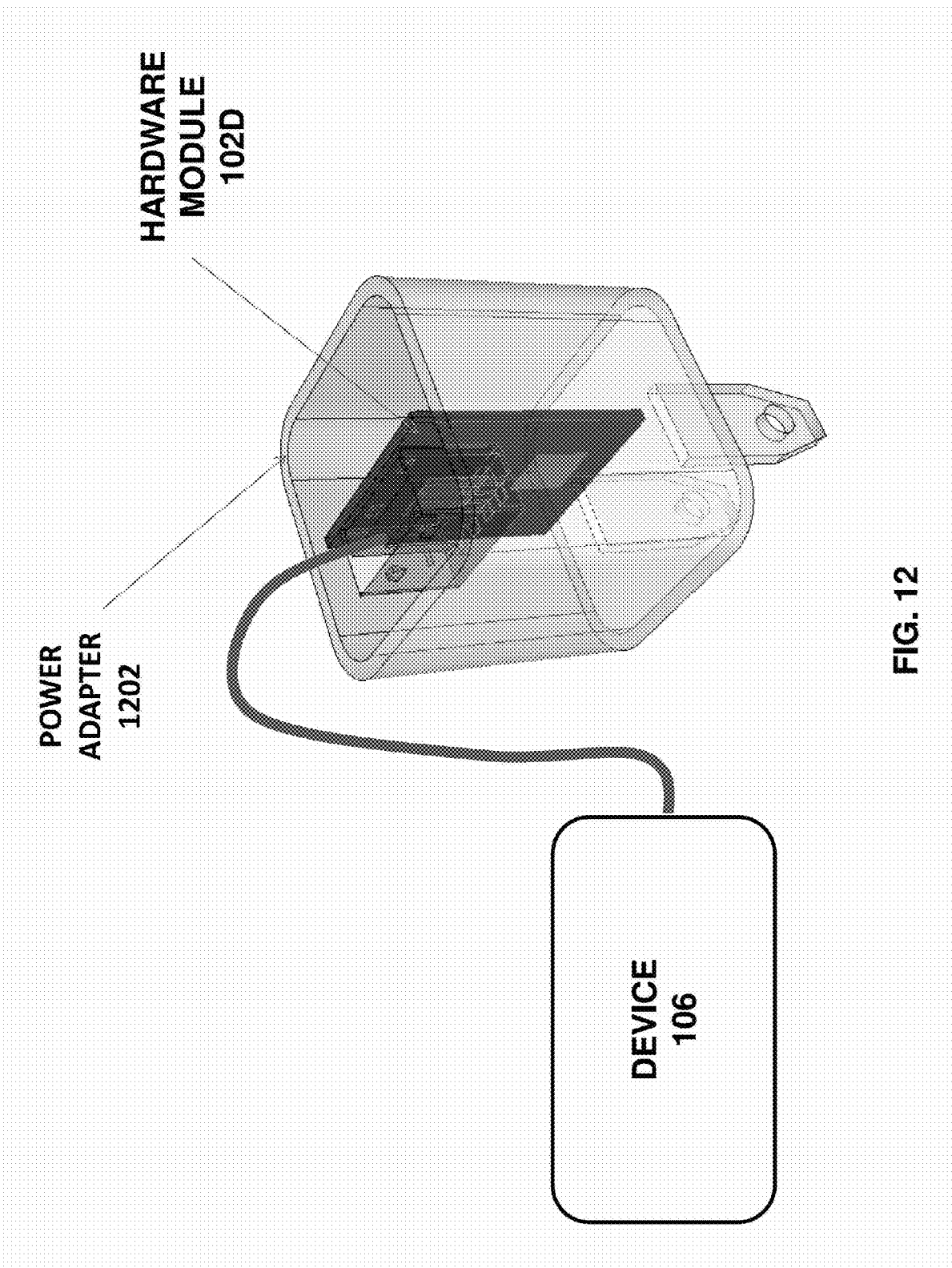
FIG. 12 illustrates an implementation of a hardware module enabled for Internet-based device control or monitoring according to an example embodiment.

FIG. 12 depicts an example implementation of hardware module 102 (i.e., hardware module 102D) incorporated with power adapter 1202. Hardware module 102D may interface with device 106, which in this embodiment may be powered via power adapter 1202, thereby enabling device 106 to connect to local network 112 and/or network 104 and, in turn, interact with module server 108. In one embodiment, hardware module 102D may interface with device 106 via a universal serial bus (USB) connector and cable or power line communication. The USB connector and cable may not necessarily use the USB protocol and may simply use the USB or USB 3.0 connector and cable for general purpose input and output. Hardware module 102D may include, for example, an internal antenna with an external option, an on/off switch, a temperature sensor, a humidity sensor, a movement sensor, an orientation sensor, an I/O channel port 216 enabled for USB or power line communication, a Wi-Fi communication component and/or an NFC communication component, a power line communication component, a buzzer, other sensors, etc.

Figure 13:
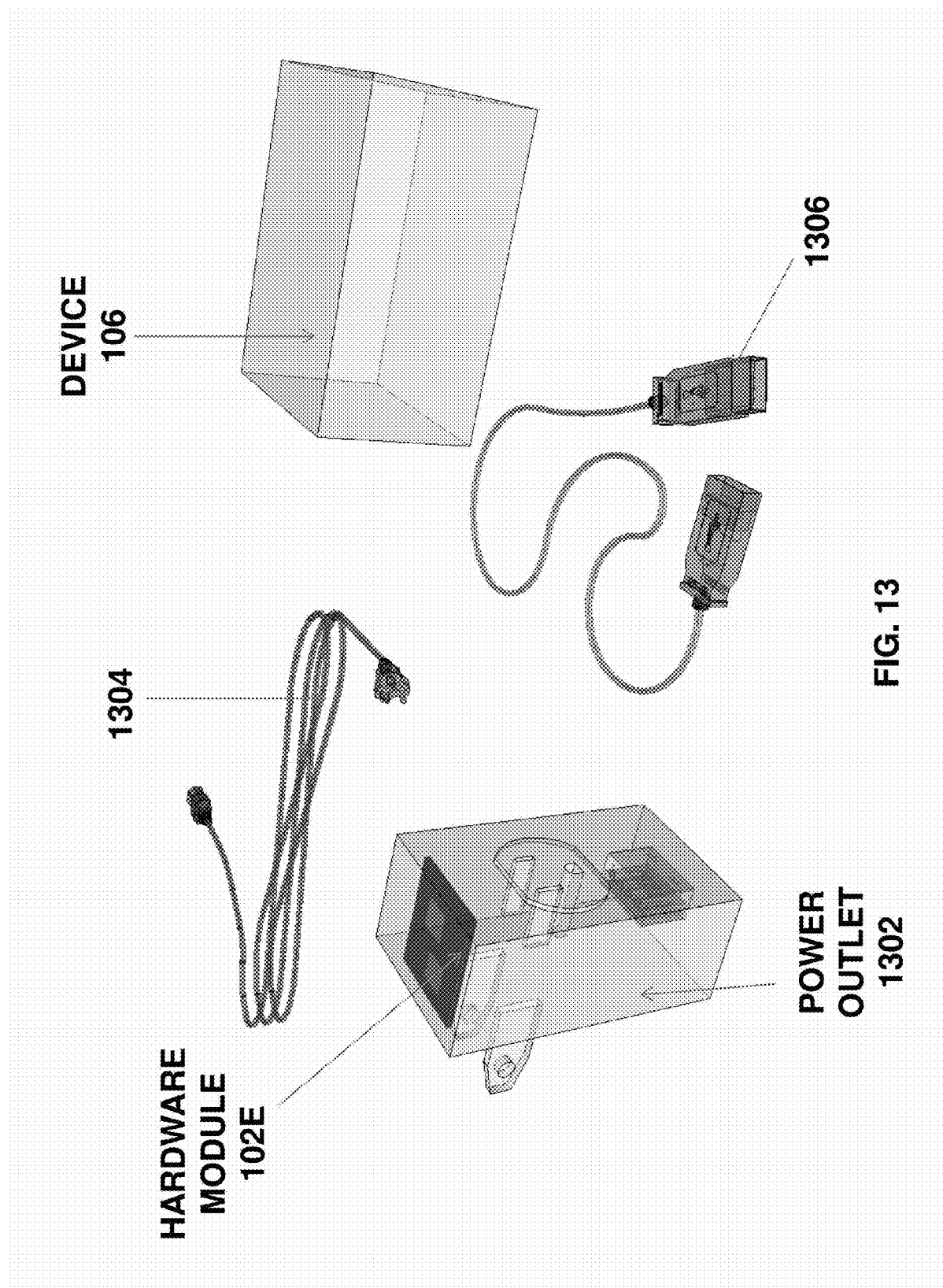
FIG. 13 illustrates an implementation of a hardware module enabled for Internet-based device control or monitoring according to an example embodiment.

FIG. 13 depicts an example implementation of hardware module 102 (i.e., hardware module 102E) incorporated with power outlet 1302. Hardware module 102E may interface with device 106 when it is connected to power outlet 1302, thereby enabling device 106 to connect to local network 112 and/or network 104 (e.g., the Internet) and, in turn, interact with module server 108. Device 106 may connect to power outlet 1302 via power line 1304 or USB connection 1306.

As mentioned, USB connectors and cables may be used to interface hardware module 102 (e.g., hardware module 102D or hardware module 102E) with device 106. USB 3.0 has five more pins than USB 2.0 and is backwards compatible to USB 2.0 for power purposes. In one embodiment, the extra USB 3.0 may be used as I/O connector ports 216.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention. Therefore, the description should not be considered to be exclusive of these other embodiments.

Also, it is to be understood that the phraseology and terminology employed herein are for the purposes of description and should not be regarded as limiting.

The invention claimed is:

1. A system for enabling interaction with a device via a network, the system comprising:
   a server; and
   a hardware module that is integrated with a power supply that provides power to the device, the hardware module configured to:
      be a client to the server,
      interface the device to the network wirelessly,
      communicate first data wirelessly from the device to the server over the network, and
      communicate to the device second data obtained from the server over the network;
   the server configured to:
      receive the first data from the hardware module connected to the network,
      communicate the first data to an additional hardware module and an access medium configured to perform one or more of the following:
      operate the device or monitor the device, and
      communicate, to the hardware module, the second data received from at least one of:
         the additional hardware module, or
         the access medium.

2. The system of claim 1, wherein the hardware module is incorporated in a case designed to be affixed to a battery.

3. The system of claim 1, wherein the hardware module is incorporated in a power adapter.

4. The system of claim 1, wherein the hardware module is incorporated in a power outlet.

5. The system of claim 1, wherein the hardware module is configured to communicate the first data regarding the device to an additional device interfaced with the hardware module.

6. A server configured to interact with a hardware module, the server comprising:
   a hardware module connection configured to communicate, via a network, information to and from the hardware module, the hardware module configured to interface a device to the network wirelessly, the hardware module being a client to the server and wirelessly communicating first data from the device to the server over the network and communicating to the device second data obtained from the server over the network, wherein the hardware module is integrated with a power supply that provides power to the device;
   an access medium connection configured to communicate, via the network, the second data to and from an access medium that is configured to perform one or more of the following: operate the device or monitor the device; and
   a controller mechanism configured to transmit the first data and the second data between the hardware module connection and:
      the access medium connection interfaced with the access medium, and
      an additional hardware module connection interfaced with an additional hardware module.

7. The server of claim 6, wherein the hardware module is incorporated in a case designed to be affixed to a battery.

8. The server of claim 6, wherein the hardware module is incorporated in a power adapter.

9. The server of claim 6, wherein the hardware module is incorporated in a power outlet.

10. The server of claim 6, further comprising a transaction identifying mechanism configured to associate a transaction identifier with the second data communicated to the hardware module.

11. A hardware module comprising:
    a casing configured to house components of the hardware module;
    a network connection mechanism configured to enable the hardware module to interact via a network as a client to a server, wherein the hardware module wirelessly communicates first data from a device to the server, and communicates to the device second data obtained from the server, and the server communicates, over the network, the first data and the second data between the hardware module and an access medium that is configured to perform one or more of the following: operate the device or monitor the device and an additional hardware module;
    a connection configured to interface the hardware module with the device; and
    a controller mechanism configured to transmit the first data and the second data between the network connection mechanism and the connection.

12. The hardware module of claim 11, wherein the casing is designed to be affixed to a battery.

13. The hardware module of claim 11, wherein the casing is incorporated in a power adapter.

14. The hardware module of claim 11, wherein the casing is incorporated in a power outlet.

15. The hardware module of claim 11, further comprising a memory mechanism configured to store the first data and the second data.

16. The hardware module of claim 11, further comprising an event processor configured to initiate communication of the first data or the second data based upon one or more of the following: a triggered event and a scheduled event.

17. A method for a hardware module-based system, the method comprising:
    interfacing a server, configured to communicate, via a network, with a first hardware module, an access medium, and a second hardware module,
    interfacing a device to the network wirelessly by the first hardware module, wherein the first hardware module is integrated with a power supply that provides power to the device, and wherein the first hardware module wirelessly communicates first data from the device to the server over the network and communicates to the device second data obtained from the server over the network, wherein the server communicates the first data to the access medium and the second hardware module, and wherein the server communicates the second data from the access medium or the second hardware module to the first hardware module;
    associating a transaction identifier with the first data;
    recording the transaction identifier associated with the first data;
    communicating, from the server to the second hardware module, the first data and the recorded transaction identifier;
    receiving a response from the second hardware module, wherein the response includes a response transaction identifier;
    determining whether the response transaction identifier matches the recorded transaction identifier;
    accepting the response if the response transaction identifier matches the recorded transaction identifier; and denying the response if the response transaction identifier does not match the recorded transaction identifier.

18. The method of claim 17, further comprising recording an unsolicited transmission identifier.

* * * * *

UNITED STATES PATENT AND TRADEMARK OFFICE
CERTIFICATE OF CORRECTION

Page 1 of 1

PATENT NO. : 9,681,357 B1
APPLICATION NO. : 14/205011
DATED : June 13, 2017
INVENTOR(S) : Robert Stanley Mawrey et al.

It is certified that error appears in the above-identified patent and that said Letters Patent is hereby corrected as shown below:

On the Title Page

First Column, (72) Inventor's name:
Reads: "Peter Thomas Scharler, Uniontown, PA (US)"
Should read: --Peter Hans Scharler, Uniontown, PA (US)--

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*